(12) United States Patent
Krill

(10) Patent No.: US 7,071,596 B2
(45) Date of Patent: Jul. 4, 2006

(54) DIELECTRIC MOTORS WITH ELECTRICALLY CONDUCTING ROTATING DRIVE SHAFTS AND VEHICLES USING SAME

(75) Inventor: Jerry A. Krill, Ellicott City, MD (US)

(73) Assignee: The Johns Hopkins University, Baltimore, MD (US)

( * ) Notice: Subject to any disclaimer, the term of this patent is extended or adjusted under 35 U.S.C. 154(b) by 166 days.

(21) Appl. No.: 10/892,910

(22) Filed: Jul. 16, 2004

(65) Prior Publication Data

US 2005/0162042 A1   Jul. 28, 2005

Related U.S. Application Data

(60) Provisional application No. 60/539,680, filed on Jan. 28, 2004.

(51) Int. Cl.
   H01L 41/08   (2006.01)
(52) U.S. Cl. ........................... 310/328; 310/800
(58) Field of Classification Search .......... 310/323.02, 310/328, 330–332, 800
   See application file for complete search history.

(56) References Cited

U.S. PATENT DOCUMENTS

| | | | |
|---|---|---|---|
| 6,069,420 A | 5/2000 | Mizzi et al. | |
| 6,084,321 A | 7/2000 | Hunter et al. | |
| 6,664,718 B1 | 12/2003 | Pelrine et al. | |
| 6,806,621 B1 * | 10/2004 | Heim et al. | 310/328 |
| 6,911,764 B1 * | 6/2005 | Pelrine et al. | 310/328 |
| 2001/0026165 A1 | 10/2001 | Pelrine et al. | |
| 2002/0008445 A1 | 1/2002 | Pelrine et al. | |
| 2002/0054060 A1 | 5/2002 | Schena | |
| 2002/0175598 A1 | 11/2002 | Helm et al. | |
| 2002/0185937 A1 | 12/2002 | Heim et al. | |
| 2003/0006669 A1 | 1/2003 | Pei et al. | |
| 2004/0008853 A1 | 1/2004 | Pelrine et al. | |

OTHER PUBLICATIONS

Penn State College of Engineering News & Media, Office of Engineering College Relations, "New flat motor can drive shape shifters, movers, and shakers," Jan. 28, 2003) article from internet www.engr.psu.edu/News/News/2003_Press_Releases/01_2003/flat_motor.htm printed Feb. 6, 2004.

Steven Ashley, "Artificial Muscles," Scientific American Oct. 2003, pp. 52-59.

(Continued)

*Primary Examiner*—Mark Budd
(74) *Attorney, Agent, or Firm*—Albert J. Fasulo, II

(57) ABSTRACT

A motor includes a support framework and a mechanical movement component moveably mounted to the support framework. An electroactive polymer device having a pair of input electrodes is configured to deform upon application of an electric potential difference across the pair of input electrodes. The electroactive polymer device is mechanically linked to the support framework and to the mechanical movement component so that deformation of the electroactive polymer device causes the movement component to move relative to the support framework. In some motors, the movement component and an electrode fixed in the support framework are driven at different electrical potentials to cause the electroactive polymer device to deform. In some motors a rolled electroactive polymer device is used with a rotating movement component. Such motors enable lightweight, powered vehicles with low radar reflectivity.

46 Claims, 12 Drawing Sheets

OTHER PUBLICATIONS

"WorldWide ElectroActive Polymers, WW-EAP (Artificial Muscles) Newsletter," Pasadena, CA Yoseph Bar-Cohen, Editor, Jun. 2003, vol. 5, No. 1, pp. 1-15 (entire newsletter).

J. Jang and Eric M. Mockensturm, "A Novel Motion Amplifier Using Axially Driver Buckling Beam," Proceedings of 2003 ASME International Mechanical Engineering Congress, Washington, DC, Nov. 15-21, 2003.

"Artificial Muscle Transducers," SRI International, Menlo Park, CA from "Areas of Expertise"article from internet http://www.artificialmuscle.com printed Feb. 6, 2004.

* cited by examiner

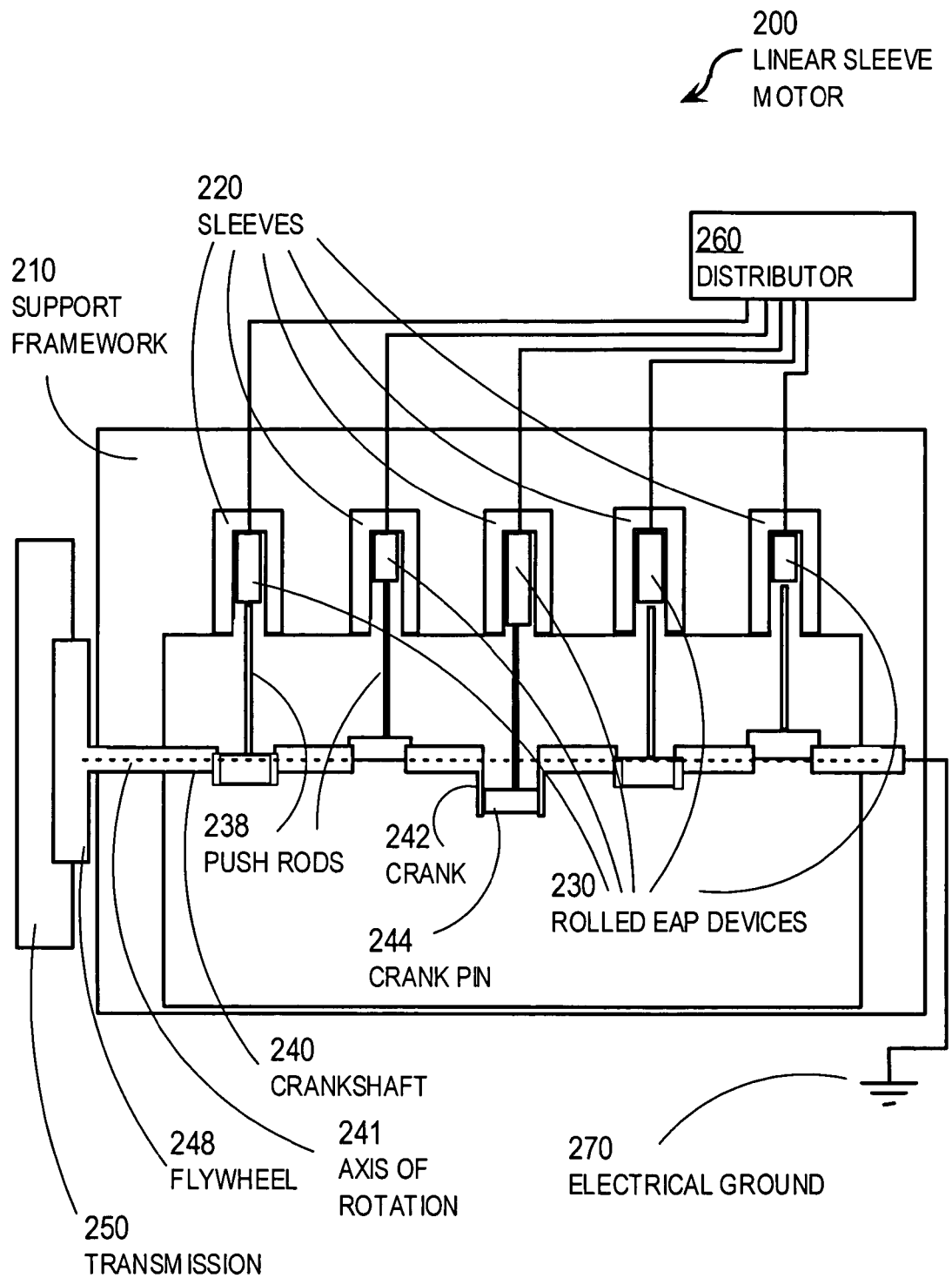

DIELECTRIC MOTORS WITH ELECTRICALLY CONDUCTING ROTATING DRIVE SHAFTS AND VEHICLES USING SAME

CROSS-REFERENCE TO RELATED APPLICATIONS

This application claims benefit of U.S. Provisional Application 60/539,680, filed Jan. 28, 2004, the entire contents of which are hereby incorporated by reference as if fully set forth herein, under 35 U.S.C. §119(e).

This application is related to U.S. non-provisional application Ser. No. 10/892,908 filed on even date herewith by inventor Jerry A. Krill, entitled "Variable Ratio Transmission Elements for Motor Drive Shafts," which is incorporated herein by reference in its entirety.

BACKGROUND OF THE INVENTION

1. Field of the Invention

The present invention relates to dielectric motors; and in particular to dielectric motors that use charged moving components, or a rolled electro-active polymer (EAP) to generate rotating mechanical motion, or both, and vehicles that employ such motors.

2. Description of the Related Art

Conventional electric motors and combustion engines are widely used in commerce but are not appropriate for all applications. For example, there is use for a class of balloon vehicles that supports a payload at high altitude, e.g., above 100,000 feet, at a relatively fixed geographic location for extended periods of time. The high altitudes may include the stratosphere layer of the atmosphere or the atmosphere of a different planet, such as Mars. Such a vehicle can support a communication terminal or surveillance system that covers a much wider area than can be served by a tower or a winged aircraft and gives more temporal coverage and detail than can be achieved from an orbiting satellite. To maintain geographic position in the presence of high altitude winds, where the air has low density, a motor is useful that can turn a station-keeping propeller that is both large and slowly rotating. Another class of vehicles includes spacecraft and satellites.

A desirable motor would be capable of providing one to several horsepower. For extended duration, the motor should be highly efficient, turning most of the energy available on board into mechanical rotation and dissipating very little as heat. To leave capacity for payload, the motor should be light, e.g., less than fifty pounds including power supply. In applications that benefit from security against attack from hostile entities, the whole platform, including the motor, should have small radar reflectivity (i.e., low radar cross-section), e.g., be as transparent to radar as plastic materials.

Combustion engines explode fuel in chambers in which a directional element, such as a piston or rotor, moves. Such engines dissipate a great deal of energy as heat, require massive engine blocks to withstand the explosions, are made of metals that have high reflectivity to radar, and require oxygen that may be in short supply at high altitudes. The oxygen requirement, alone, makes combustion engines unsuitable for some vehicles, such as satellites and other spacecraft.

Electric motors include alternating current (AC) motors, direct current (DC) motors, servo motors, and stepper motors. Electric motors utilize magnets which are made of metal, and are therefore relatively massive and have high radar reflectivity. AC motors are limited to a few speeds that are related to the AC frequency of an AC power supply. The speeds are relatively high, over a thousand revolutions per minute (rpm). To attain different speeds, a gearbox is attached to the driveshaft. These motors draw substantial current and therefore require relative heavy sources of electrical power, such as AC generators and large banks of batteries.

Compressed gas and hydraulic motors require a source of gas or hydraulic fluid and have poor energy efficiency as chemical energy is converted first to pressure and then to mechanical movement.

A new class of motors uses electroactive polymers (EAPs) to convert from electrical to mechanical energy. When a voltage is applied to electrodes in contact with an EAP, the EAP deforms. An EAP sandwiched between stretchable electrodes deforms in two dimensions as described in U.S. Pat. No. 6,664,718 by Pelrine et al., entitled "Monolithic Electroactive Polymers" (hereinafter, Pelrine I). In EAP motors, the deformation is leveraged to provide mechanical motion. Metallic content can be reduced substantially in such motors. The electrodes can be thin or formed with non-metallic conductors, such a carbon nanotubes. The transfer from electrical energy to mechanical energy is quite efficient.

Linear EAP motors are described, for example, in U.S. patent application US 2002/0008445 by Pelrine et al., entitled "Energy Efficient Electroactive Polymers and Electroactive Polymer Devices" (hereinafter, Pelrine II). Such motors are quite useful in some applications that rely on linear motion, as in robotic appendages. However, such linear motors suffer some disadvantages. Linear motors often require motion-constraining components to direct two-dimensional deformation from a sheet of EAP material into one dimension. Such components add to complexity and are subject to wear and breakdown. Such linear motors also fail to take advantage of a wide range of well established technologies to use rotating drive shafts, such as are common in the automobile and aircraft industries.

Rotary motion provided by flat sheets of EAP sandwiched between stretchable electrodes are described in U.S. patent applications US 2002/0175598 by Heim et al., entitled "Electroactive Polymer Rotary Clutch Motors" (hereinafter, Heim I) and in U.S. patent application US 2002/0185937 by Heim et al., entitled "Electroactive Polymer Rotary Motors" (hereinafter, Heim II). Such motors can take advantage of the well established technologies that use rotating drive shafts.

However, the motors described in Heim I and Heim II provide low power—well less than one horsepower, and therefore insufficient to move a propeller such as envisioned for some applications. Furthermore, the described motors involve numerous joints and extensions to convert small stroke linear deformations into rotating movement; such joints and extensions add to complexity and are subject to wear and failure. For example, Heim I requires use of a clutch to engage a range of motion in one direction (a stroke) and disengage during a return stroke. In addition, the space required for long beams to extend from the EAP to a rotating shaft increases the size and weight of the motor. Furthermore, the sheets in Heim II require relative large size to achieve a useful stroke and a relatively large volume to provide a unit force. Joints and pins located at one point in the sheet are subject to large stresses and can be expected to be a point of failure, such as a source of a fissure in the sheet.

Based on the foregoing, there is a clear need for a lightweight, low-metallic motor with sufficient horsepower that does not suffer the disadvantages of prior art motors.

SUMMARY OF THE INVENTION

Motors are provided that enable lightweight, powered vehicles with low radar reflectivity. The motors include a support framework and a mechanical movement component moveably mounted to the support framework. An electroactive polymer device having a pair of input electrodes is configured to deform upon application of an electric potential difference across the pair of input electrodes. The electroactive polymer device is mechanically linked to the support framework and to the mechanical movement component so that deformation of the electroactive polymer device causes the movement component to move relative to the support framework.

According to one set of embodiments, the movement component and an electrode fixed in the support framework are driven at different electrical potentials to cause the electroactive polymer device to deform. In these embodiments the motor includes a voltage input for receiving a time varying electrical potential. The support framework includes a framework electrode maintained at the voltage input or an electrical ground or both. The mechanical movement component includes a movement component electrode maintained at a second electrical voltage based on the voltage input or electrical ground or both. One input electrode of the pair of input electrodes for the electroactive polymer device is electrically connected to the framework electrode. A different input electrode of the pair is electrically connected to the movement component electrode. In some embodiments the movement component electrode is a conductive coating on the movement component.

According to another set of embodiments a rolled electroactive polymer device is used with a rotating movement component. In these embodiments the rolled electroactive polymer device has a pair of input electrodes and is configured to deform primarily parallel to a roll longitudinal axis upon application of an electric potential difference across the pair of input electrodes. The movement component is a rotating shaft. Deformation of the rolled electroactive polymer device causes the shaft to complete a revolution relative to the support framework.

According to one set of embodiments, the support framework includes a sleeve that has a sleeve longitudinal axis and a sleeve base. A rolled electroactive polymer device is disposed in the sleeve with the roll longitudinal axis aligned with the sleeve longitudinal axis. The movement component is a crankshaft mounted to the support framework so as to allow the crankshaft to rotate with respect to the support framework. A first portion of the rolled electroactive polymer device pushes against the sleeve base and a second, different portion of the rolled electroactive polymer device is mechanically connected to a crank pin of the crankshaft. Deformation of the rolled electroactive polymer device causes the crankshaft to rotate with respect to the support framework.

In some of these embodiments one or more of the rolled electroactive polymer device, the sleeves, the support framework, and the crankshaft are constructed to be light or have low radar reflectivity or both.

In some of these embodiments, the support framework includes multiple sleeves and the crankshaft has multiple crank pins. The motor includes multiple rolled electroactive polymer devices disposed in the sleeves. Each rolled electroactive polymer device has a first portion that pushes against a sleeve base in a corresponding sleeve and a second different portion mechanically connected to a corresponding crank pin.

In some of these embodiments the motor is capable of providing over one horsepower or a variable rotation rate or both.

In some of these embodiments, the control of the rotation rate is so smooth that a flywheel can be omitted.

According to another set of embodiments, a motor includes a support framework, a shaft rotatably mounted to the support framework, and an electroactive polymer assembly. The shaft has a longitudinal shaft rotation axis and an arm that encloses a position substantively offset from the shaft axis. The electroactive polymer assembly includes a pair of structures joined at a pivot joint, and a rolled electroactive polymer device. Each of two longitudinally opposite ends of the electroactive polymer device is connected to a corresponding structure of the pair of structures. Deformation of the rolled electroactive polymer device causes a first structure of the pair of structures to exert a force against the support framework and a different second structure of the pair to exert a force against the arm of the shaft at a position substantively offset from the shaft axis. As a result, the shaft rotates about the shaft axis with respect to the support framework.

In some of these embodiments one or more of the rolled electroactive polymer device, the pair of structures, the pivot joint, the support framework, and the shaft are constructed to be light or have low radar reflectivity or both.

In some of these embodiments, the motor includes multiple electroactive polymer assemblies. Deformation of a rolled electroactive polymer device in each electroactive polymer assembly causes a first structure of a corresponding pair of structures to push against the support framework and a different second structure of the corresponding pair to push against the arm of the shaft at a position substantively offset from the shaft axis.

In some of these embodiments the motor is capable of providing over one horsepower or a variable rotation rate or both.

In some of these embodiments, the control of the rotation rate is so smooth that a flywheel can be omitted.

In some of these embodiments, the pivot joint is a hinge that confines relative motion of the pair of structures to a particular plane.

In some of these embodiments, at least one structure of the pair of structures includes a different electroactive polymer assembly or the support framework or the arm of the shaft.

According to one set of embodiments, a lightweight, powered vehicle with low radar reflectivity includes a vehicle chassis, a motor, and a propeller. The vehicle chassis has low radar reflectivity for deployment in a fluid medium. The motor is mounted to the vehicle chassis, and includes a support framework, a shaft and multiple electroactive polymer devices. The support framework has low radar reflectivity. The shaft has low radar reflectivity and is rotatably mounted to the support framework. Each device has a pair of input electrodes configured to deform upon application of an electric potential difference across the pair of input electrodes. The electroactive polymer devices are mechanically linked to the support framework and to the shaft so that deformation of the electroactive polymer devices causes the shaft to rotate relative to the support framework with at least one horsepower. The propeller has low radar reflectivity, and is mechanically connected to the shaft to rotate the propeller. The fluid medium is moved relative to the vehicle chassis by rotating the propeller.

BRIEF DESCRIPTION OF THE DRAWINGS

The present invention is illustrated by way of example, and not by way of limitation, in the figures of the accompanying drawings and in which like reference numerals refer to similar elements and in which:

FIG. 2 is a block diagram that illustrates a linear sleeve motor according to an embodiment;

DETAILED DESCRIPTION

Motors and vehicle are described that employ electroactive polymer (EAP) devices. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Many embodiments of the invention are described in the context of a motor for a lightweight vehicle of low radar reflectivity, which is made possible using many of the described embodiments. However, the invention is not limited to this context, and may be employed in heavier vehicles, with greater radar reflectivity, as well as in non-vehicular applications.

Figure 1A:
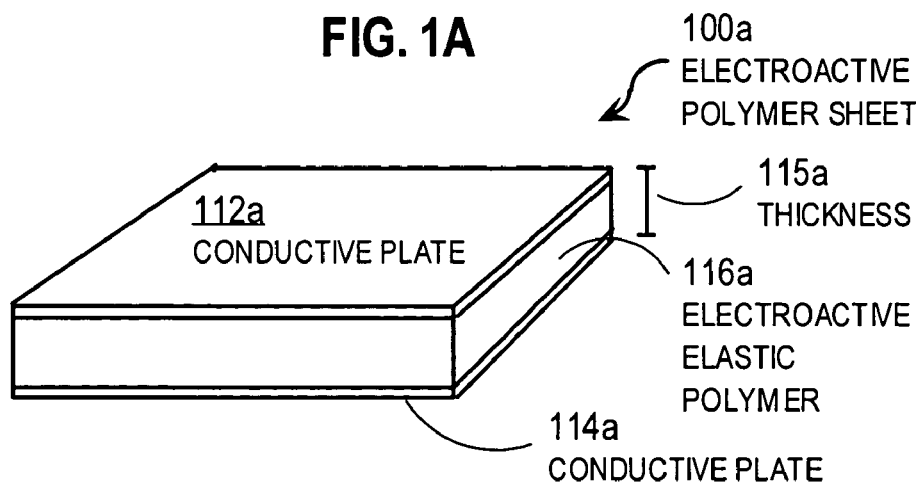
FIG. 1A is a block diagram that illustrates an electroactive polymer sheet device in a first state.
Figure 1B:
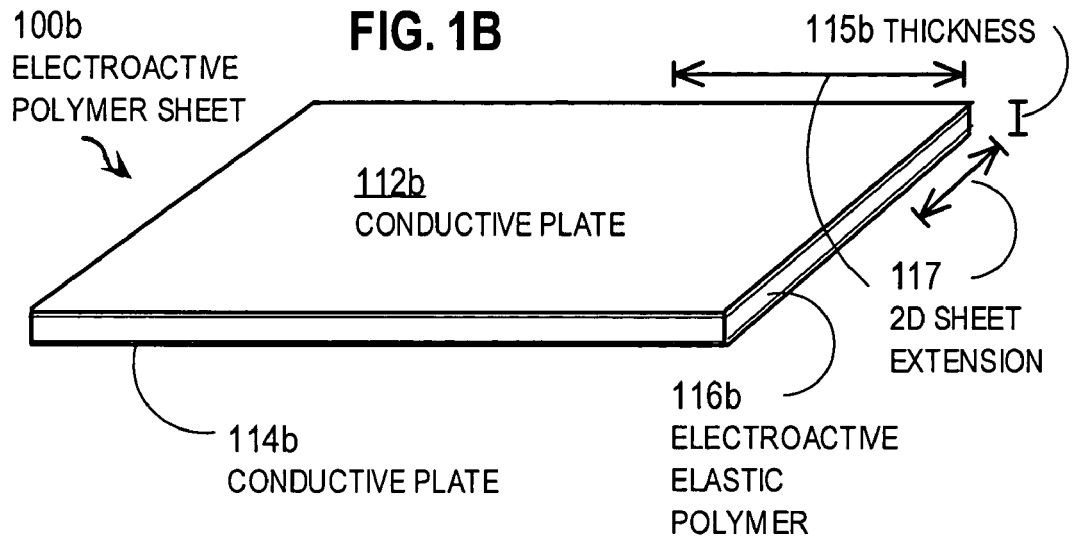
FIG. 1B is a block diagram that illustrates the electroactive polymer sheet device of FIG. 1A in a different, second state.

As described in Pelrine I and illustrated in FIG. 1A and FIG. 1B, an electroactive polymer (EAP) deforms under the influence of a strong electrical field. FIG. 1A is a block diagram that illustrates an EAP sheet device 100a in a first state. The device 100a includes electroactive elastic polymer 116a, sandwiched between conductive plates 112a, 114a. For purposes of illustration, it is assumed that the first state corresponds to applying no electrical potential (voltage) difference between the conductive plates 112a, 114a. The sheet device 100a has a thickness 115a that is on the order of tens of microns (1 micron=1 micrometer=$10^{-6}$ meters).

FIG. 1B is a block diagram that illustrates the EAP sheet device 100b which is the same as device 100a of FIG. 1A but in a different, second state. The device 100b includes electroactive elastic polymer 116b, sandwiched between conductive plates 112b, 114b. For purposes of illustration, it is assumed that the second state corresponds to maintaining a large voltage difference (thousands of volts) between the conductive plates 112b, 114b. As shown in FIG. 1B, the electroactive elastic polymer 116b has thinned and stretched under the influence of the voltage difference. The conductive plates 112b, 114b have also thinned and stretched with the polymer, which is possible for some conductors made of certain materials, as described in Pelrine L The device 100b has thinned to a thickness 115b, less than thickness 115a of the device 100a in the first state. The device 100b has stretched in two dimensions as indicated by the sheet extension arrows 117. Because the polymer is a non-conducting dielectric, very little current flows while in each state.

The maximum extension and corresponding voltage difference depends on the material and construction of the EAP sheet device. For example, the EAP sheet device can be formed under tension so that the sheet expands further under the influence of the voltage difference. Alternatively, the EAP sheet device can be formed under tension so that it shrinks, rather than expands, under an applied voltage differences. Some known sheet devices have achieved strains (percentage change in linear dimension) of 10 to 15 percent. The sheets are thin and may be too fragile for many macroscopic applications.

As described in Heim I and Heim II, and mentioned above, motors based on sheet devices are known. Such motors must leverage a stroke of 10 to 15 percent up to the degree of movement desired for an application and generally offer only low power. In most of these motors, extension is two dimensions is undesirable, so constraining components are added to the sheet devices in these motors to force extension in one dimension.

A particular arrangement of electroactive polymer and electrodes is described in U.S. patent applications US 2003/0006669 by Pei et al., entitled "Rolled Electroactive Polymers" (hereinafter, Pei), the entire contents of which are hereby incorporated by reference as if fully set forth herein. This arrangement of EAP and electrodes is called hereinafter a spring roll EAP. Spring roll EAPs are considered herein to be members of a more general class of rolled EAP devices. Other rolled EAP devices may include or omit springs or other pre-tensioning elements, and may have cross sections that are not circular. For example, triangular cross sections may be used in some rolled EAP devices.

Figure 1C:
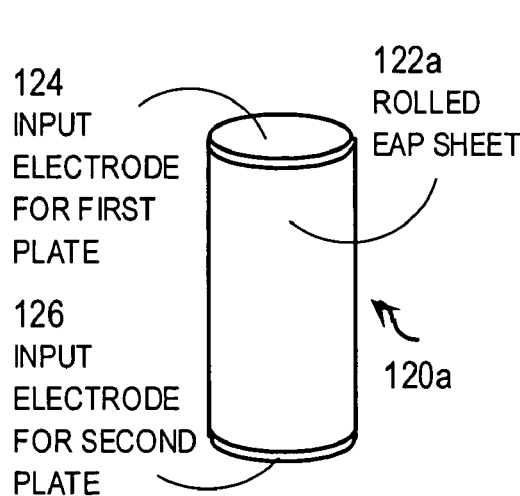
FIG. 1C is a block diagram that illustrates a rolled electroactive polymer device in a first state.

FIG. 1C is a block diagram that illustrates a rolled EAP device 120a in a first state. The electroactive polymer sheet device 100a of FIG. 1A is rolled to form a rolled EAP sheet 122a. Conductive plate 112a of sheet device 100a is connected to one input electrode 124. Conductive plate 114a of sheet device 100a is connected to a second input electrode 126. The sheet 100a may be rolled on a pre-tensioned spring (not shown).

Figure 1D:
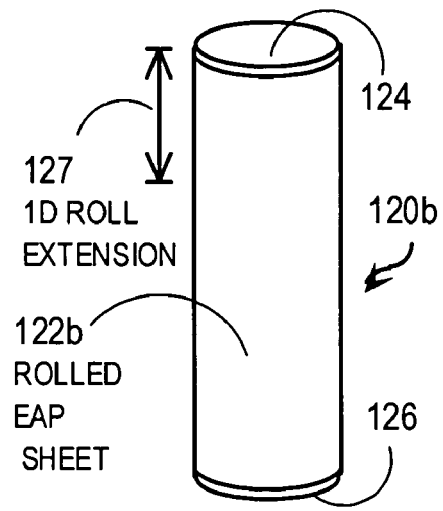
FIG. 1D is a block diagram that illustrates the rolled electroactive polymer device of FIG. 1A in a different, second state.

FIG. 1D is a block diagram that illustrates the rolled EAP device 120b, which is the same as the device 120a of FIG. 1C but in a different, second state. The device 120b includes electrodes 124, 126 and a rolled EAP sheet 122b in the second state. For purposes of illustration, it is assumed that the second state corresponds to maintaining a large voltage difference between the input electrodes 124, 126 and their corresponding plates. As shown in FIG. 1D, the cylinder has stretched under the influence of the voltage difference. The device 120b has stretched in one dimension as indicated by the roll extension arrow 127.

Known spring rolls are cylindrical in shape, with a diameter less than 2 centimeters (cm, 1 cm=$10^{-2}$ meters) and a length of about six cm. When a voltage is applied, the roll can extend 2 cm (about 30%) and produce 6.6 pounds of force. Extension-retraction cycles can be performed at rates up to 50 Hz. It is expected that advances in this field will yield more EAP materials and rolled EAP materials with greater strength or strain or cycle rates or some combination of improvements. For purposes of illustration, it is assumed that rolled EAP devices are utilized with the properties of currently known spring rolls. It is anticipated that more advanced rolled devices may be substituted in the following motors, with commensurate changes in the number and size of the illustrated elements.

Rolled EAP devices offer more directed power per unit volume than EAP sheet devices. The spring roll EAP devices are also expected to be less fragile than their sheet counterparts. The one dimensional stroke (range of motion during one extension-retraction cycle) is easier to tap and requires fewer constraining components. Such constraining components add to complexity and may increase unreliability in the motors based on the EAP sheet devices such as described in Heim I and Heim II.

Sleeve Motors.

In a class of motors herein called sleeve motors, rolled EAP devices are used like pistons in a combustion engine to turn a crankshaft. An advantage of this arrangement is that engine design is well-advanced for combustion engines, and such design capability can be readily tapped to implement and improve performance of this class of motors. In addition, the output is rotating mechanical movement which is widely used to drive various devices. Therefore the technology of employing rotational movement can be employed with little modification. The pistons and sleeves of this class of motors can be arranged in any manner known in the art of combustion engines, including linear sleeve motors, radial sleeve motors, and any combination of the two, such as V-engine configurations.

Unlike combustion engines, the motors in this class can be made of lightweight materials, such as honeycombed plastic and composite materials, with little metal content and little radar reflectivity.

In the ensuing description, the terms "electrode" and "electrical connector" may be used interchangeably and equivalently. FIG. 2 is a block diagram that illustrates a linear sleeve motor 200 according to an embodiment. The motor 200 includes a support framework 210 with sleeves 220, a crankshaft 240, and rolled EAP devices 230 positioned in the sleeves 220. Also shown in FIG. 2 are a flywheel 248, a transmission 250, a voltage distributor 260, and electrical ground 270.

The support framework 210 is made of any material that can support the stresses imposed by a particular configuration of rolled EAP devices, sleeves, and crankshaft. In various embodiments, the support framework is massive and made of metal. In an illustrated embodiment, the support framework 210 is made of a light strong material with low radar reflectivity, such as honeycombed plastic, ceramic, or composite materials, among others. The support framework 210 provides a stationary base for the rotary mechanical movement produced by the motor, which base can be attached to a vehicle or a fixed platform.

The sleeves 220 are fixed in the support framework 210. Although shown as separate components that may be made of a different material than the support framework 210, or different structure for the same material, in other embodiments, the sleeves 220 are simply holes in the support framework 210, such as drilled or molded holes. Each sleeve has a longitudinal axis and a base that intersects that axis. In the illustrated embodiment, five sleeves 220 are included in support framework 210 and their longitudinal axes are coplanar. In other embodiments more or fewer sleeves are fixed in the support framework. At least one sleeve is required for a sleeve motor. In the illustrated embodiment, the open mouth opposite the base of each sleeve 220 is nearly flush with an interior surface of the support framework 210. In other embodiments, the mouth of each sleeve may be below or above the interior surface of the support framework 210.

The crankshaft 240 is mounted to the support framework 210 so as to allow rotational motion relative to the support framework 210. Such mounting is well known in the art of motors and does not require further description here. Any rotation-supporting mounting that is appropriate to the materials and stresses of the motor may be used, including mountings with methods of lubrication and fluid or gas seals.

Crankshafts are also well known in the art of motors and will not be described in great detail here. The crankshaft 240 has a longitudinal axis of rotation 241 with one or more sections of shaft coaxial with the axis of rotation and one or more pairs of cranks 242 that extend away from the axis of rotation. Between each pair of cranks 242, a section of shaft is omitted and a crank pin 244 that can rotate with respect to the cranks 242 is inserted instead.

The crankshaft 240 is made of any material that can support the stresses imposed by a particular configuration of rolled EAP devices, sleeves, and support framework. In various embodiments, the crankshaft is massive or made of metal. In an illustrated embodiment, the crankshaft 240 is made of a light strong material with low radar reflectivity, such as honeycombed plastic, ceramic, or composite materials, among others. The crankshaft 240 undergoes the rotary mechanical movement produced by the motor. The rotary movement is coupled to various appliances well known in the arts of motors, motorized appliances, and vehicles.

In the illustrated embodiment, the crankshaft is coaxially attached to a flywheel 248 to provide angular inertia for smooth rotation. In the illustrated embodiment, the flywheel 248 is integral with the crankshaft 240. In other embodiments, the flywheel 248 is a separate component attached to the crankshaft, and may be considered part of or separate from the motor 200. In some embodiments, the flywheel 248 is omitted entirely. In various embodiments, the flywheel is massive or made of metal. In an illustrated embodiment, the flywheel 248 is made of a light strong material with low radar reflectivity, such as honeycombed plastic, ceramic, or composite materials, among others.

In the illustrated embodiment, the crankshaft is coupled with a transmission 250 to provide gearing to a different rotation rate for applications that may use different rotation rates than produced in the crankshaft 240. In the illustrated embodiment, the transmission 250 is a separate component attached to the flywheel 248, and may be considered part of or separate from the motor. In various other embodiments, the transmission 250 is connected to a different part of the crankshaft 240 or omitted entirely. In various embodiments, the transmission is massive or made of metal. In an illustrated embodiment, the transmission 250 is made of a light strong material with low radar reflectivity, such as honeycombed plastic, ceramic, or composite materials, among others.

The motive force for the motor 200 is based on rolled EAP devices 230, such as the spring roll EAP devices of Pei. Each rolled EAP device 230 is inserted in a corresponding sleeve 220 so that the longitudinal axis of the device 230 is parallel with the longitudinal axis of the sleeve 220. One end of each rolled EAP device 230 pushes against the base of the corresponding sleeve 220, at least during a portion of an expansion-retraction cycle for the device 230. The other end of the rolled EAP device 230 is mechanically connected to a crank pin 244.

In the illustrated embodiment, the mechanical connection is through a pushrod 238. In some other embodiments, the mechanical connection is direct so that push rods 238 are omitted. In still other embodiments, the mechanical connection is through different push rods, such as jointed push rods. Any push rods or push rod designs known in the art may be used. In various embodiments, the push rods are massive or made of metal. In an illustrated embodiment, the push rods 238 are made of a light strong material with low radar reflectivity, such as honeycombed plastic, ceramic, or composite materials, among others.

When the rolled EAP device 230 extends and pushes against the base of a sleeve 220, the other end forces the crank pin 244 mechanically attached to device 230 through push rod 238 to apply a force at the crank pin, which results in a torque applied to the crankshaft 240. In response to this torque, the crankshaft 240 rotates about its axis 241, as is well known in the art.

The timing of the force with respect to the position of the crank pin 244 determines the direction of rotations of the crankshaft. The timing of the force is controlled by the application of a time varying voltage from the distributor 260. The distributor 260 is a high voltage distributor with an internal or external voltage supply (not shown). The distributor is used to provide a separate time varying voltage to each rolled EAP device. The distributor is electrically connected to at least one input electrode in each rolled EAP device. In some embodiments, the distributor 260 is internal to the motor 200. In other embodiments, the motor 200 includes one or more electrodes on the surface of the support framework 210 that are connected to at least one input electrode on each rolled EAP device and excludes the distributor. In such embodiments, an external distributor is electrically connected to the electrodes on the surface of the support framework 210. In some embodiments, distributor 260 is controlled by an information processor; and in some embodiments the distributor is controlled by a mechanical or hydraulic connection to the crankshaft 240, as known in early design combustion engines.

In some embodiments, described in more detail in a later section, the distributor 260 drives the extension-retraction cycle of the rolled EAP devices at varying rates (frequencies) up to the maximum rate, designated hereinafter $M_R$, (e.g., 50 Hz for current spring roll EAP devices). In some embodiments, described in the later section, the distributor 260, interleaves the cycles of different rolled EAP devices to drive the crankshaft at variable rates up to the product of $M_R$ and the number of rolled EAP devices. This relationship is given in Equation 1

$$S_R = M_R * N \qquad (1)$$

where $S_R$ is the rotation rate of the shaft and N is the number of rolled EAP devices separately connected mechanically to the crankshaft. For example, in some embodiments with 20 spring roll EAP devices separately mechanically connected to the crankshaft, the distributor 260 may drive the motor 200 up to 1000 Hz (60,000 rpm).

In the illustrated embodiment, the end of the rolled EAP device 230 that pushes against the base of the sleeve 220 is fixed at the base of the sleeve 220 during the entire extension-retraction cycle. This embodiment does not support shaft rotation rates ($S_R$) greater than the maximum cycle rate of the individual rolled EAP devices ($M_R$). In other embodiments, described in more detail below, the rolled EAP device 230 only contacts the base of the sleeve 220 during a portion of the extension-retraction cycle when the device 230 is extended. Such embodiments do support shaft rotation rates ($S_R$) greater than the maximum cycle rate of the individual rolled EAP devices ($M_R$).

In the illustrated embodiment, the distributor 260 is electrically connected to each input electrode in a fixed end of the rolled EAP device to provide a time varying voltage at that electrode. The voltage difference at each rolled EAP device is produced by electrically connecting the other input electrode to electrical ground 270, through the push rods 238 and crankshaft 240. To electrically connect the push rods 238 and crankshaft 240 to electrical ground, the push rods and crankshaft are made to be electrically conducting in the illustrated embodiment. In some such embodiments, the push rods and crankshaft are made of metal. In a preferred embodiment, the push rods and crankshaft are made of a light strong material with low radar reflectivity, and a conductive coating is applied to one or both to make their surfaces electrically conductive. In some embodiments, the push rods 238 or crankshaft 240, or both, are non-conductive, and a wire is run through or etched onto the non-conducting component to make contact with a conducing component so that the second input electrode on each rolled EAP device is electrically connected to electrical ground.

In another embodiment (not shown) the sleeves are maintained at electrical ground and electrical connections from the distributor are passed through the crankshaft to each rolled EAP device through a corresponding pushrod. In embodiments with one sleeve and one rolled EAP device, a conductive crankshaft and push rod may be used, such as with a conductive strip on a non-conducting material. In embodiments with multiple sleeves 220 and rolled EAP devices 230, the electrical connections should be insulated from each other within the crankshaft 240. A conductive surface coating for the crankshaft 240 can still be used for one rolled EAP device 230, but the other electrical connections should be insulated within the crankshaft 240. Each push rod 238 can be electrically conductive because no push rod 238 is connected to more than one rolled EAP device 230 in the illustrated embodiment.

In still other embodiments, described in more detail below, both input voltages are passed to the rolled EAP device along one or more insulated electrical connections that pass through the fixed sleeve into the rolled EAP device. In still other embodiments, described in more detail below, both input voltages are passed to the rolled EAP device along one or more insulated electrical connections that pass through the crankshaft into the rolled EAP device.

The stroke provided by the linear arrangement illustrated in FIG. 2 is 2 cm using current spring roll EAP devices, so the crank offset in the crankshaft should be 1 cm. A larger stroke can be obtained with these spring rolls by stacking additional spring rolls in each sleeve or by freeing the end of the rolled EAP device facing the base of the sleeve to move within the sleeve. The force available using current spring roll EAP devices is 6.6 pounds for cycle rates up to 50 Hz. To obtain one horsepower, about twenty spring roll EAP devices should be disposed in up to twenty sleeves 220. For simplicity, all twenty rolled EAP devices have not been shown; it is a matter of design to scale up the illustrated embodiment to obtain one or more horsepower.

Figure 3:
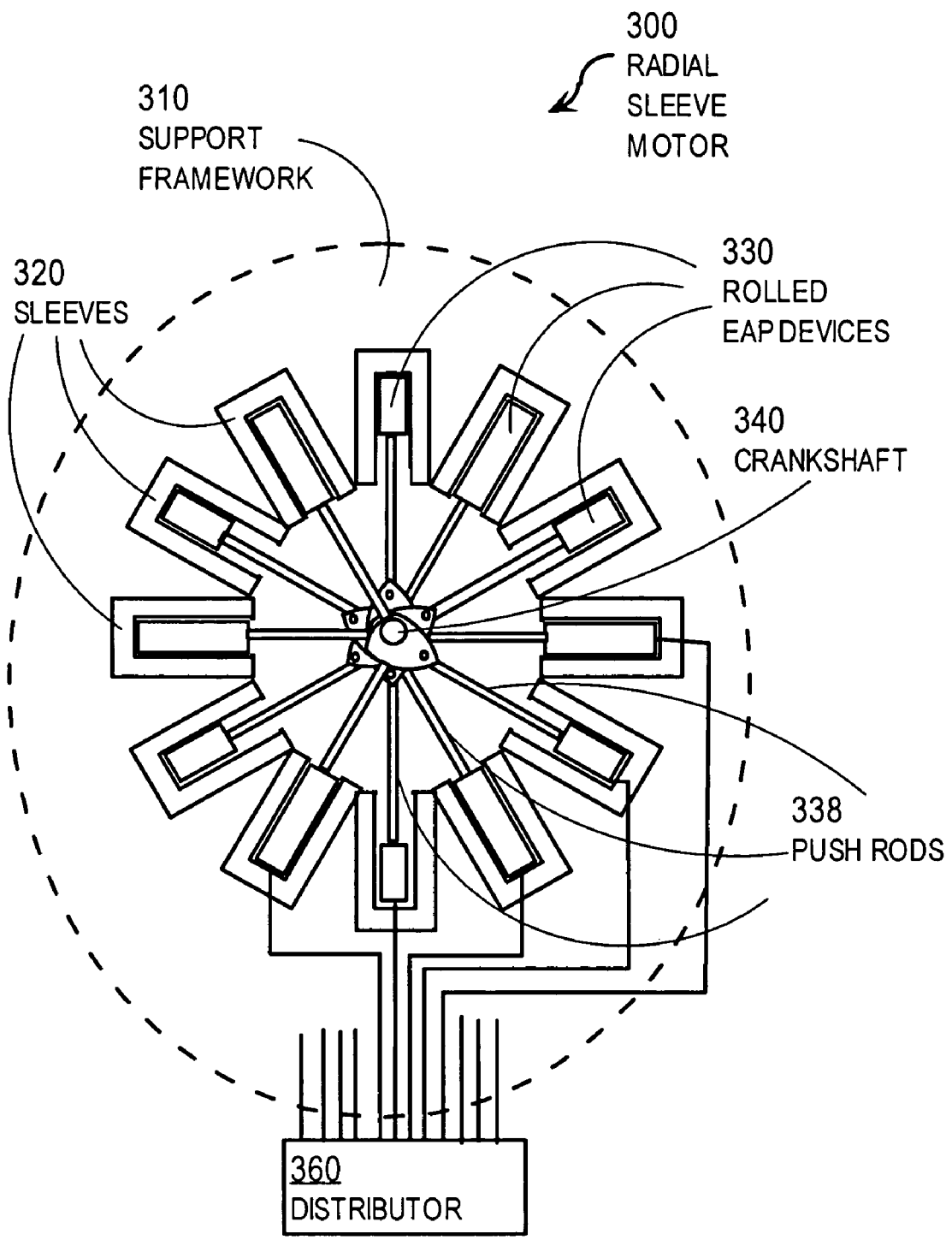
FIG. 3 is a block diagram that illustrates a radial sleeve motor according to an embodiment.

FIG. 3 is a block diagram that illustrates a radial sleeve motor 300 according to an embodiment. Combustion engines of similar design are known for aircraft applications. The motor 300 includes a support framework 310 with sleeves 320, a crankshaft 340, and rolled EAP devices 330 positioned in the sleeves 320. Also shown in FIG. 3 is a voltage distributor 360. The view in FIG. 3 is in the direction of the axis of rotation of crankshaft 340.

In the illustrated embodiment, there are twelve sleeves arranged radially with twelve rolled EAP devices 330. In other embodiments, more or fewer sleeves and rolled EAP devices are employed. For example, only every third or fourth sleeve and rolled EAP device depicted in FIG. 3 is used in some embodiments. In some embodiments, entirely different angles for the radial sleeves are used. The sleeves need not be symmetric; for example, in a V configuration only the sleeves that correspond approximately to clock positions 1 and 11 are included.

The function and materials of these components are similar to the analogous components depicted in FIG. 2 and described above.

In the illustrated embodiment, the crankshaft 340 and push rods 338 are electrically conductive and electrically connected to electrical ground, similar to motor 200.

A similar radial arrangement may be configured at one or more different positions along the length of the crankshaft 340 to combine the designs of linear and radial configurations. For example, a twenty spring roll engine can be produced with a four sleeve radial arrangement positioned at each of five locations along the crankshaft.

Figure 4A:
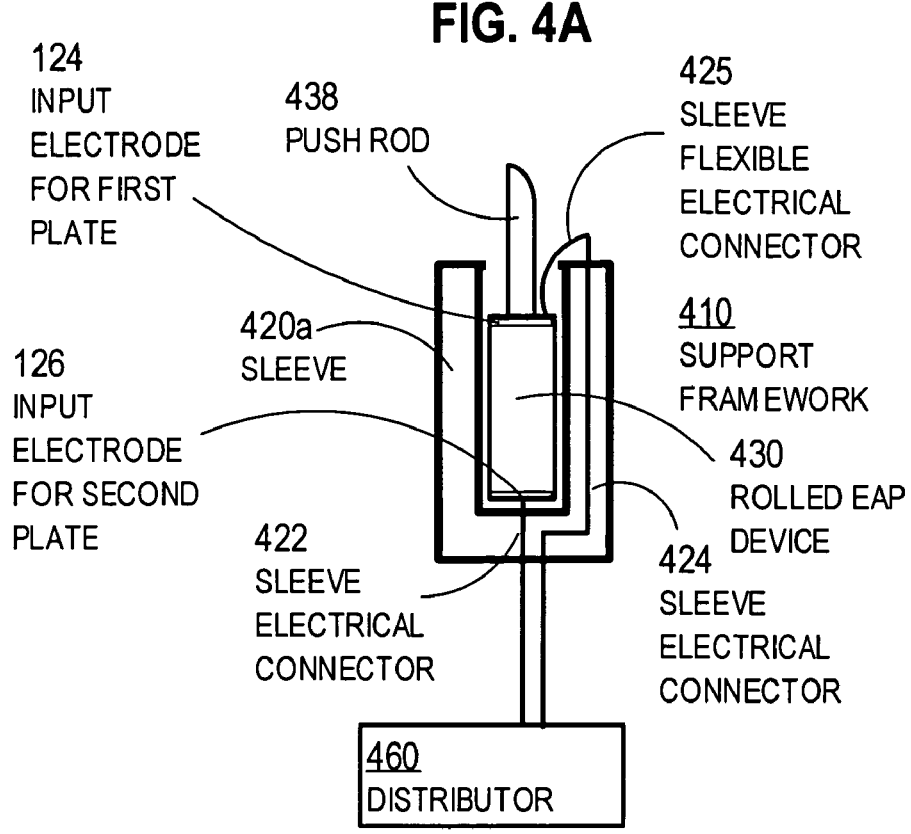
FIG. 4A is a block diagram that illustrates electrical connections in a sleeve according to an embodiment.

FIG. 4A is a block diagram that illustrates electrical connections in a sleeve 420a according to an embodiment. In the embodiment of FIG. 4A, both electrical potentials are provided through the sleeve 420a to rolled EAP device 430. Rolled EAP device 430 is the same as shown in FIG. 1C, with an input electrode for first plate 124 and an input electrode for second plate 126 at opposite ends of the rolled EAP device 430. A push rod 438 mechanically connects the rolled EAP device 430 with a crankshaft (not shown). The input electrode 126 is connected to a distributor 460, as shown in motors 200 and 300, with a sleeve electrical connector 422. Unlike the motors 200, 300, in the embodiment of FIG. 4A, a second sleeve electrical connector 424 is electrically connected to the input electrode 124 on the end of the rolled EAP device 430 mechanically connected to the crankshaft. In the illustrated embodiment, a sleeve flexible electrical connector 425 electrically connects the input electrode 124 to the second sleeve electrical connector 424.

The second sleeve electrical connector 424 is shown also connected to the distributor 460. In some other embodiments, one of the sleeve electrical connectors 422, 424 is connected directly to electrical ground. For example, the base of sleeve 420a can be electrically grounded by sleeve electrical connector 422. Alternatively, the mouth of sleeve 420a can be electrically grounded by sleeve electrical connector 424.

In some other embodiments, one or both electrical connections pass through the push rod 438 and crankshaft to either distributor 460 or electrical ground.

Figure 4B:
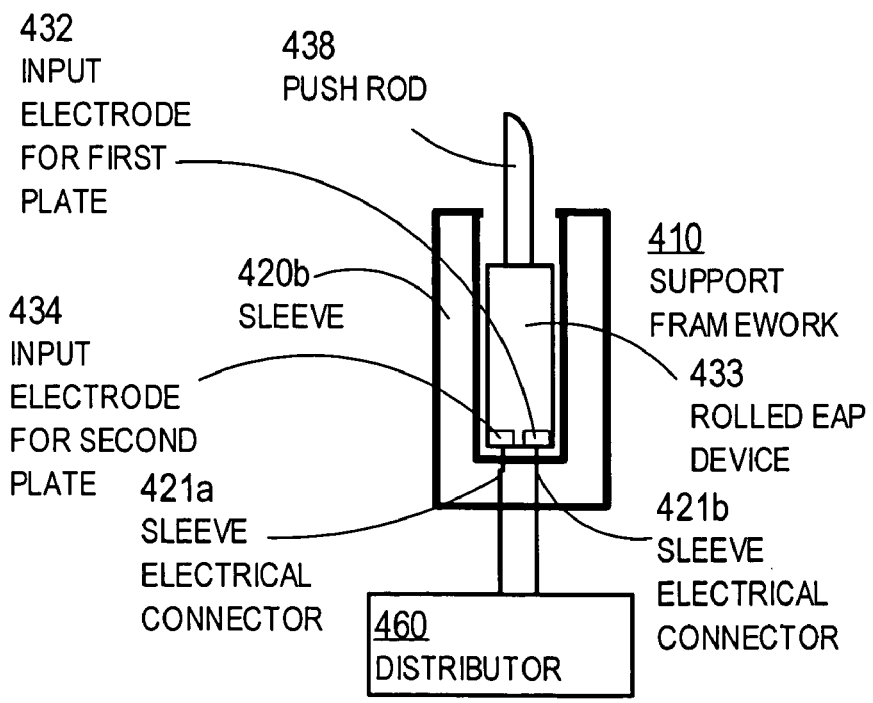
FIG. 4B is a block diagram that illustrates electrical connections in a sleeve according to another embodiment.

FIG. 4B is a block diagram that illustrates electrical connections in a sleeve 420b according to another embodiment. In the embodiment of FIG. 4B, both electrical potentials are provided through the sleeve 420b to rolled EAP device 433. Rolled EAP device 433 has both input electrodes 432, 434 on the same end that is fixed to the base of the sleeve 420b. Input electrode 432 is the input electrode for a first plate and input electrode 434 is the input electrode for a second plate of the EAP device. A push rod 438 mechanically connects the rolled EAP device 433 with a crankshaft (not shown). The input electrode 434 is connected to a distributor 460 with a sleeve electrical connector 421a. The input electrode 432 is connected to a distributor 460 with a sleeve electrical connector 421b. In some other embodiments, one of the sleeve electrical connectors 421a, 421b is connected directly to electrical ground. In some other embodiments, one or both electrical connections pass through the push rod 438 and crankshaft to either distributor 460 or electrical ground.

Figure 4C:
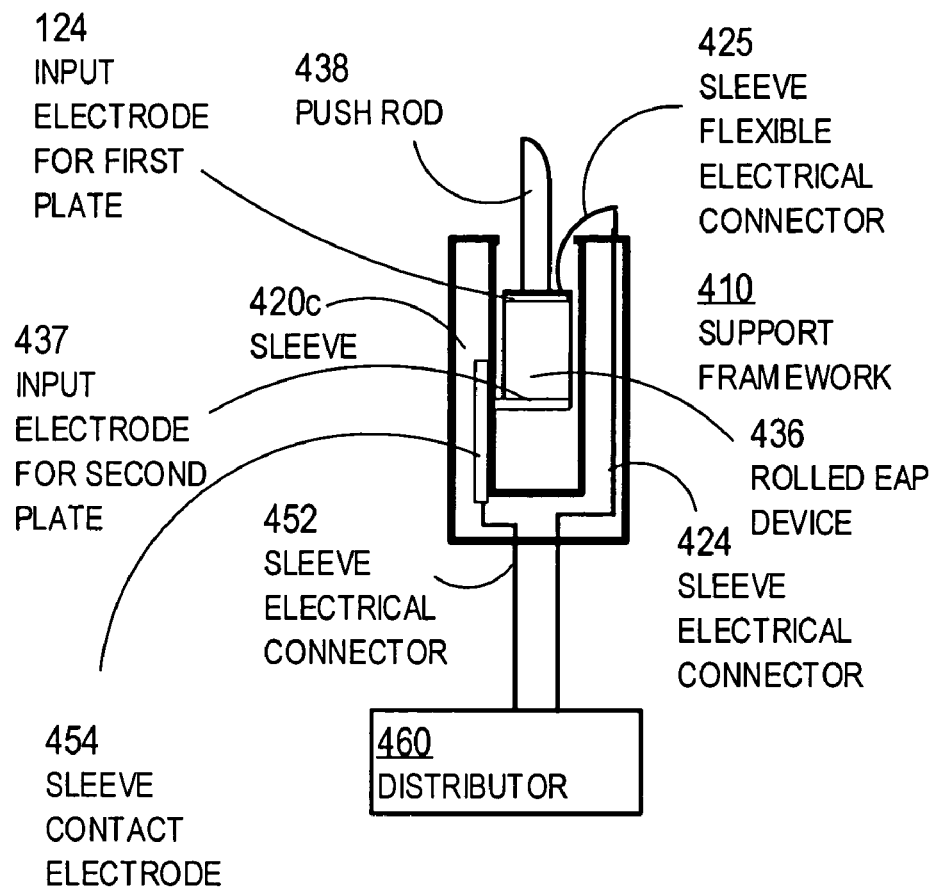
FIG. 4C is a block diagram that illustrates electrical connections in a sleeve according to another embodiment.

FIG. 4C is a block diagram that illustrates electrical connections in a sleeve 420c according to another embodiment. A rolled EAP device 436 is positioned in the sleeve 420c. The rolled EAP device has input electrode 124 for a first plate at one end and input electrode 437 for a second plate at the other end. The rolled EAP device is mechanically connected to the crankshaft through the push rod 438 at the end with input electrode 124. In this embodiment, the rolled EAP device does not have one end fixed in the base of the sleeve 420c, but separates from the sleeve during some part of the rotation of the crankshaft. Such an embodiment is useful when the crankshaft is rotating at a rate $S_R$ greater than the maximum cycle rate $M_R$ of the rolled EAP device. In this embodiment, the end of the rolled EAP device 436 facing the base of the sleeve 420c contacts the base of the sleeve 420c and pushes against the base of the sleeve only during some portion of the extension phase of the extension-retraction cycle. To provide the driving potentials in this embodiment the sleeve 420c includes electrical connections and electrodes as depicted in FIG. 4C.

In the embodiment of FIG. 4C, both electrical potentials are provided through the sleeve 420c to rolled EAP device 436. The input electrode 124 is connected to a distributor 460 with a sleeve electrical connector 424 and sleeve flexible electrical connector 425 as shown in FIG. 4A. The input electrode 437 is connected to a distributor 460 with a sleeve electrical connector 452 through sleeve contact electrode 454. As the input electrode 437 slides along the sleeve 420c with the rotating crankshaft, the sleeve contact electrode maintains electrical contact with it. In some embodiments, the sleeve contact electrode 454 extends along the inner wall of sleeve 420a a sufficient distance to maintain contact with input electrode 437 during the entire extension-retraction cycle. In some embodiments, the sleeve contact electrode 454 extends along the inner wall of sleeve 420a a shorter distance to establish contact with input electrode 437 only during the extension phase of the extension-retraction cycle.

In some other embodiments, one of the sleeve electrical connectors 424, 452 is connected directly to electrical ground. In some other embodiments, one or both electrical connections pass through the push rod 438 and crankshaft to either distributor 460 or a relative electrical ground, whether a lead bolted to the frame or a return inside the distributor. For example, in some embodiments, sleeve electrical connector 424 and sleeve flexible electrical connector 425 are omitted; and the crankshaft and push rod 438 are electrically conductive and connected to electrical ground, as shown in FIG. 2.

Figure 4D:
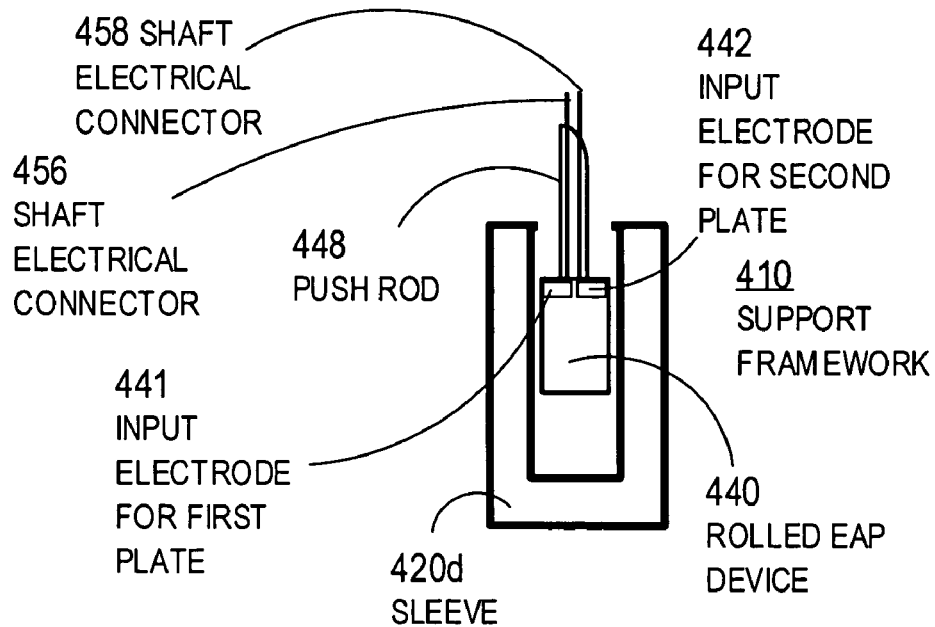
FIG. 4D is a block diagram that illustrates electrical connections in a push rod according to another embodiment.

FIG. 4D is a block diagram that illustrates electrical connections in a push rod according to another embodiment. A rolled EAP device 440 is positioned in the sleeve 420d. The rolled EAP device 440 has input electrode 441 for a first plate and input electrode 442 for a second plate both at the same end. The rolled EAP device is mechanically connected to the crankshaft through the push rod 448 at the end with both input electrodes 441, 442. In this embodiment, similar to the embodiment of FIG. 4C, the rolled EAP device does not have one end fixed in the base of the sleeve 420d, but separates from the sleeve during some part of the rotation of the crankshaft.

In the embodiment of FIG. 4D, both electrical potentials are provided through the push rod 448 to rolled EAP device 440. The input electrode 441 is connected to a distributor or electrical ground with a shaft electrical connector 456 that passes through push rod 448. The input electrode 442 is connected to a distributor or electrical ground with a shaft electrical connector 458 that passes through push rod 448. In some embodiments, the push rod 448 and crankshaft are electrically conductive and one of shaft electrical connectors 456, 458 is electrically insulated from the push rod 448 and crankshaft.

Lever Motors.

In a class of motors herein called lever motors, rolled EAP devices are used to extend or retract pivoted structures to turn a shaft. An advantage of this arrangement is that the output is rotating mechanical movement which is widely used to drive various devices. Therefore the technology of employing rotational movement can be employed with little modification. An advantage of this class of motors over electric motors is that some motors in this class can be run at continuously variable rotation rates without using a transmission or gearbox. A further advantage of this class of motors over electric motors is that the motors in this class can be made of lightweight materials, such as honeycombed plastic and composite materials, with little metal content and little radar reflectivity. An advantage of this class of motors over other EAP motors is that the motors in this class use rolled EAP devices that are less fragile than sheet EAP devices. A further advantage of this class of motors over other EAP motors is that the motors in this class do not involve the complexity and unreliability of constraining members to provide one dimensional movement from two dimensional expansions.

A lever motor includes one or more rolled EAP assemblies. A rolled EAP assembly includes two structures moveably connected at a joint. Each structure is mechanically connected to a different end of the rolled EAP device. In some embodiments, electrical connections pass through either or both structures to the two input electrodes of the rolled EAP device. The joint keeps the two structures attached but allows them to pivot with respect to each other in one or more directions.

Figure 5A:
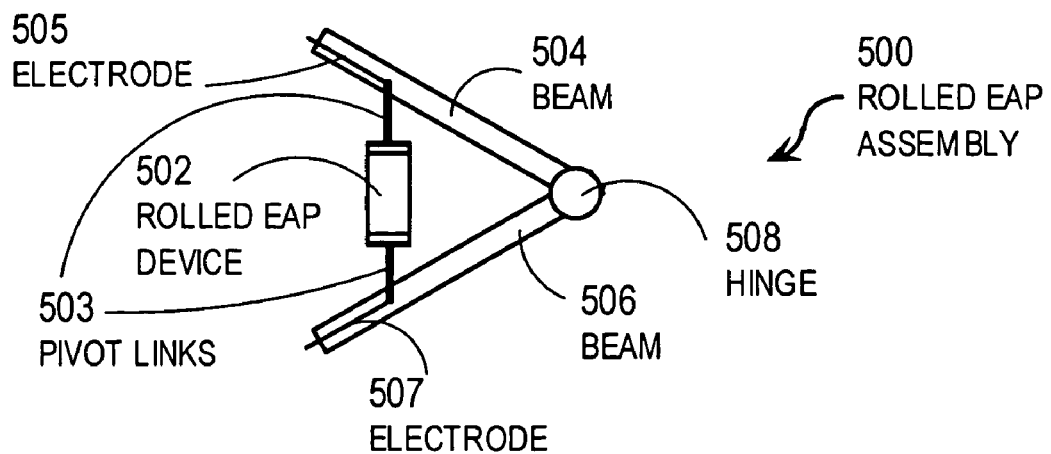
FIG. 5A is a block diagram that illustrates a rolled EAP hinge assembly according to an embodiment.

FIG. 5A is a block diagram that illustrates a rolled EAP hinge assembly 500 according to an embodiment. The assembly 500 includes a rolled EAP device 502, such as a spring roll EAP device. The assembly also includes two beams 504, 506 connected at a hinge 508. Hinge 508 is a joint that confines relative motion to one plane. Opposite ends of rolled EAP device 502 are mechanically connected to different beams 504, 506. Electrode 505 passes through beam 504 to provide an electrical voltage at one input electrode of rolled EAP device 502; and electrode 507 passes through beam 506 to provide a second electrical voltage at a different input electrode of rolled EAP device 502.

When the rolled EAP device is activated by a voltage difference between electrodes 505, 507, the beams move with respect to each other, either to open or close the angle made by the beams at hinge 508. The stroke of the ends of the beams 504, 506 depends on the stroke of the rolled EAP device, the distance from the EAP to the hinge 508, and the length of the beams 504, 506. In general, the stroke of the ends of the beams is greater than the stroke of the rolled EAP device.

In a preferred embodiment, the hinge and beams are made of a strong light material with low radar reflectivity.

Figure 5B:
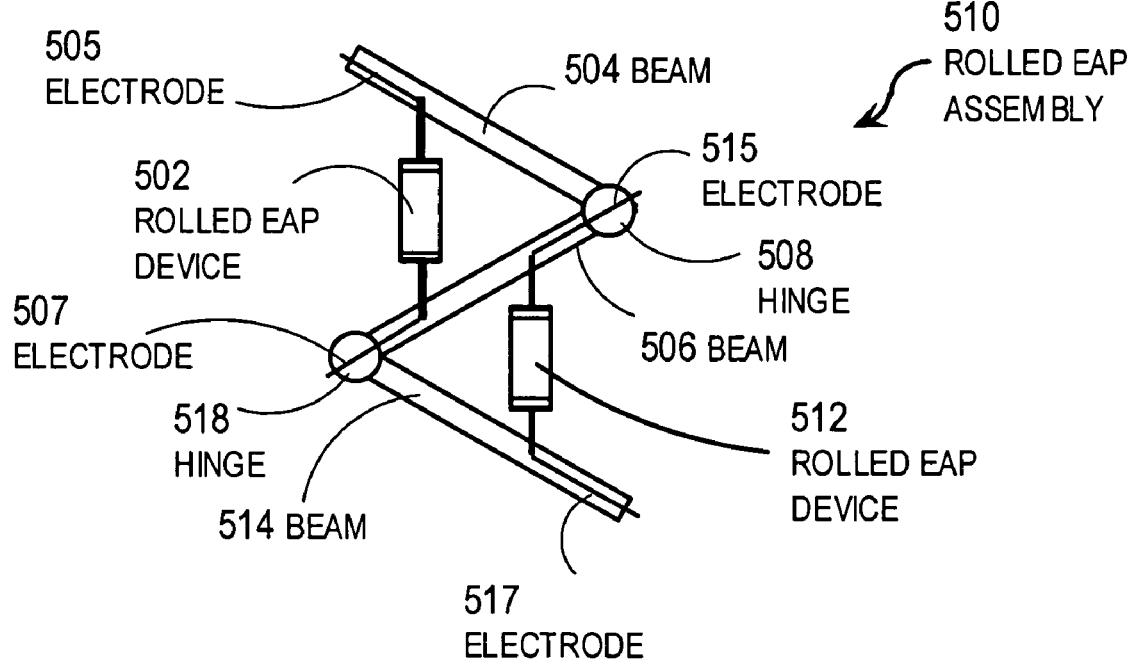
FIG. 5B is a block diagram that illustrates a rolled EAP hinge assembly according to another embodiment.

FIG. 5B is a block diagram that illustrates a rolled EAP hinge assembly 510 according to another embodiment. In this embodiment beam 506 of FIG. 5A is replaced by a second EAP hinge assembly. The second EAP hinge assembly includes a rolled EAP device 512, and two beams 506, 514 connected at a hinge 518. Opposite ends of rolled EAP device 512 are mechanically connected to different beams 514, 506. Electrode 515 passes through beam 506 to provide a third electrical voltage at one input electrode of rolled EAP device 512, and electrode 517 passes through beam 514 to provide a fourth electrical voltage at a different input electrode of rolled EAP device 512.

In some embodiments, two or more of these electrodes may be connected to reduce the number of voltages to supply. For example, electrodes 507 and 515 may be connected to electrical ground. In some embodiments, the beams 504, 506, 514 and hinges 508, 518 may be electrically conductive, ether by being made with a conductive material or being coated or etched with a conductive material; for example, to bring electrical ground to the vicinity of electrodes 507, 515. In such embodiments, electrodes 505 and 517 are insulated from the conductive beams 504, 606, 514 and hinges 508, 518.

In other embodiments, one or more of the beams 504, 506 of assembly 500 are replaced by one or more other structures. For example, in some embodiments, beam 504 or 506 is replaced by a support structure for a motor, as described in more detail below. In some embodiments, beam 504 or 506 is replaced by a component attached to a rotating shaft, as described in more detail below.

Figure 6A:
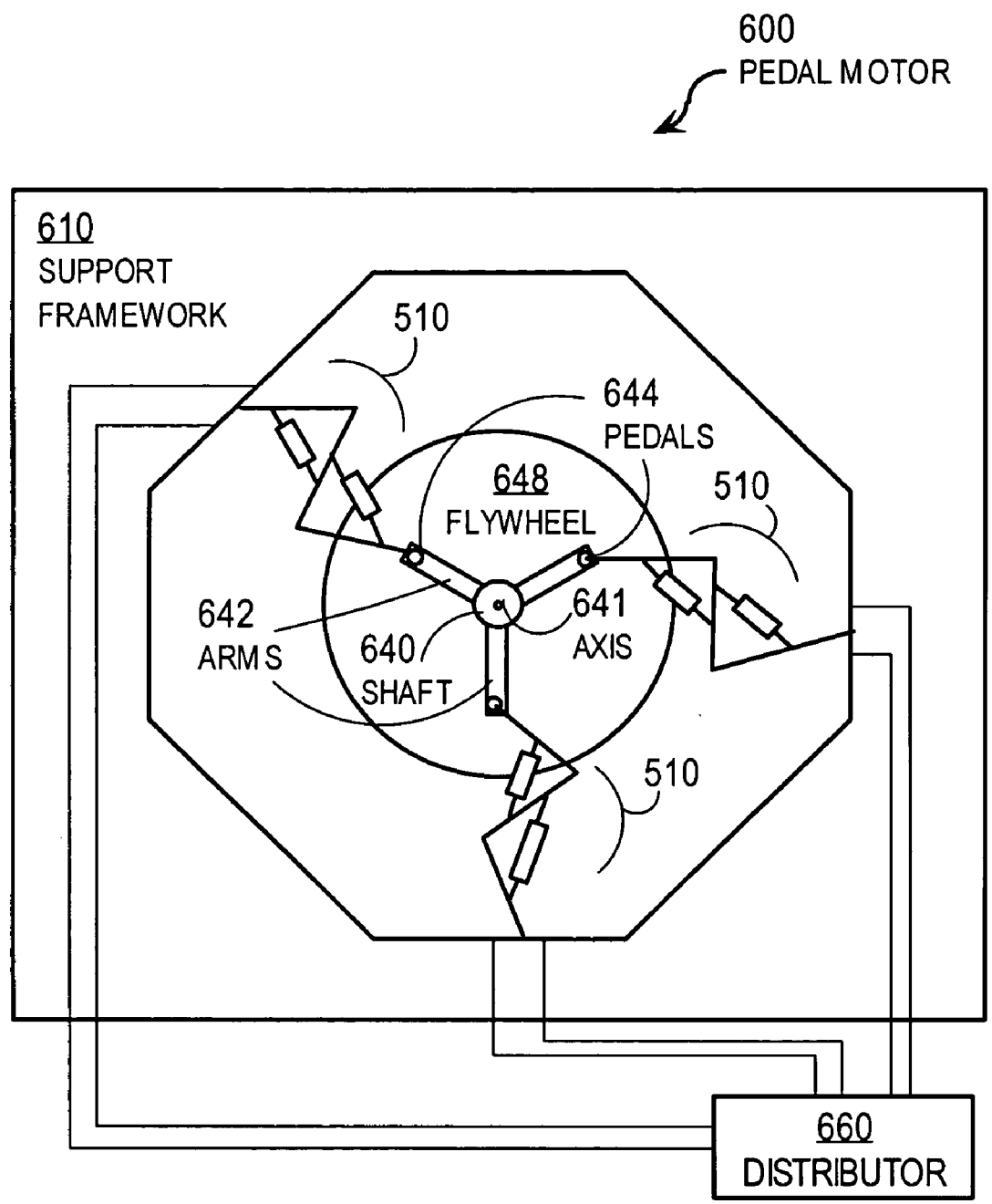
FIG. 6A is a block diagram that illustrates a pedal motor according to an embodiment.

FIG. 6A is a block diagram that illustrates a pedal motor 600 according to an embodiment. The motor 600 includes a support framework 610, a shaft 640 having an axis of rotation 641, and multiple rolled EAP assemblies 510. Also shown in FIG. 6 are a voltage distributor 660 and a flywheel 648 having an axis concentric with the shaft axis 641. The view in FIG. 6 is in the direction of the axis of rotation of shaft 640. The function and materials of these components are similar to the analogous components depicted in FIG. 2 or FIG. 5A and described above.

In the illustrated embodiment, there are three rolled EAP assemblies 510 arranged radially around the axis of rotation. In other embodiments, more or fewer or different rolled EAP assemblies are employed. The rolled EAP assemblies are attached to the support framework 610 by a pivot joint, such as a hinge, so that the rolled EAP assembly can pivot with respect to the support framework. In some embodiments, a rolled EAP assembly is replaced by a rolled EAP in a sleeve attached to framework 610. In some embodiments, the flywheel 648 is omitted.

In the illustrated embodiment, the shaft 640 includes arms 642 that extend outward from the axis 641 to provide leverage for the rolled EAP assemblies to apply torque on the shaft 640. At the end of each arm 642 is a pedal 644 rotatably connected to the arm 642. Each rolled EAP assembly is attached at one end to the support framework 610 and at the other end to a pedal 644. As each assembly extends and retracts the force applied to the pedal 644 applies torque on the corresponding arm 642 which causes the shaft to rotate. In the illustrated embodiment the shaft 641 is a crankshaft, the arms 642 are cranks, the pedals 644 are crank pins, and the three rolled EAP assemblies and there corresponding arms 642 are displaced or spaced apart from one another along the length of the shaft 640. That is, arms 642 are coupled to shaft 640 in a manner similar to the way push rods 238 are coupled to crank shaft 242, i.e., to cranks 242 and crank pins 244, in motor 200 depicted in FIG. 2. Essentially, arms 642 act like push rods 238.

In some other embodiments, more than one rolled EAP assembly is attached to each pedal, each attachment freely rotating with respect to the other attachment. In some other embodiments, one or more of the arms is at an end of the shaft, and the pedal is connected to the shaft arm at only one end. In some embodiments, the arm is a disk concentric with the axis 641, and the pedal is attached to a face of the disk. In some embodiments, the shaft is a cylinder and one or more pedals are attached to one or more faces at one or more ends of the cylinder, or the shaft consists of multiple cylindrical segments with one or more pedals attached to one or faces at the ends of the multiple cylinders.

Figure 6B:
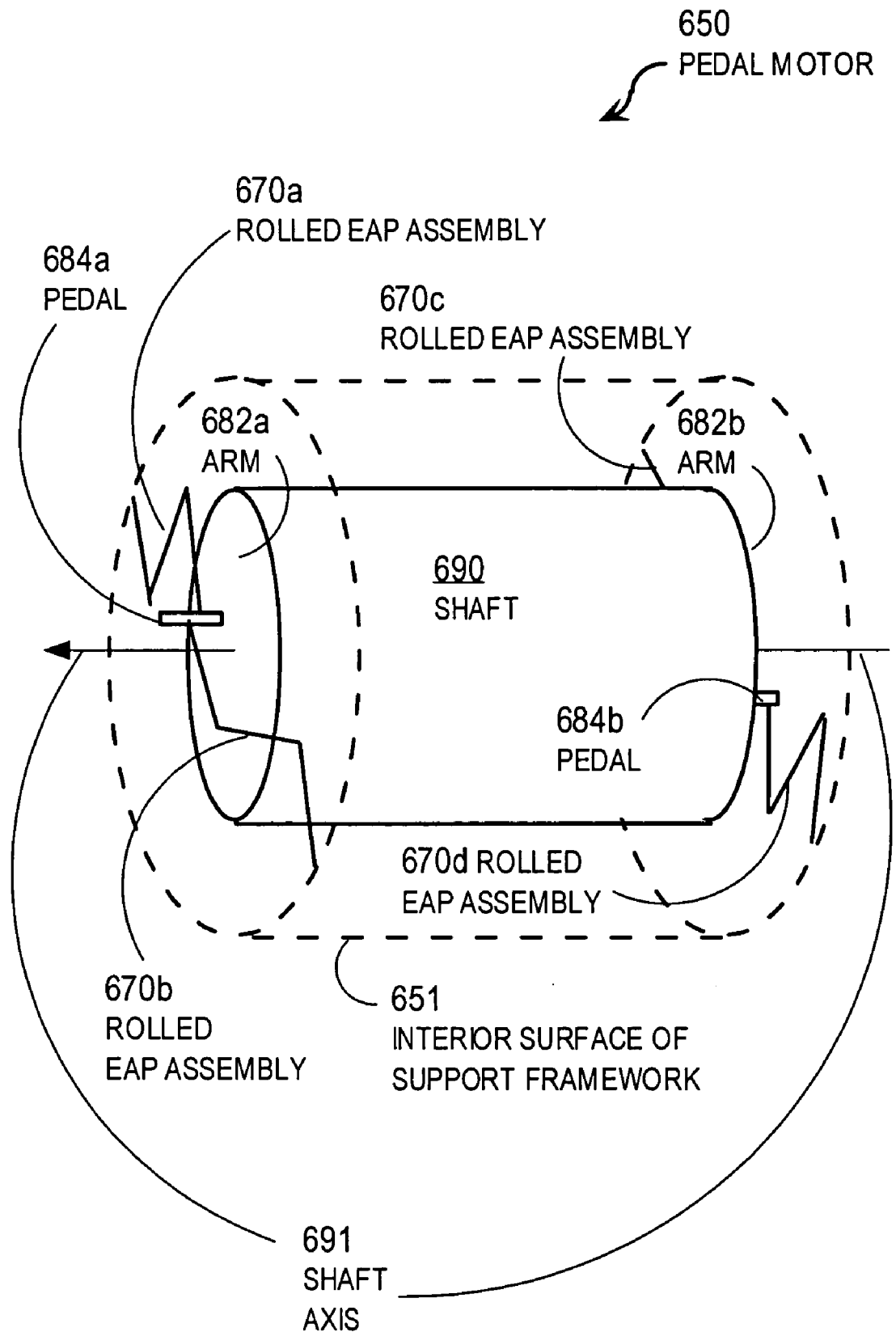
FIG. 6B is a block diagram that illustrates a pedal motor according to another embodiment.

FIG. 6B is a block diagram that illustrates a pedal motor 650 according to another embodiment. A wide cylindrical shaft 690 with shaft axis 691 replaces the rod-like crankshaft 640 of motor 600. The two faces of shaft 690 serves as the arms 682a, 682b of motor 650 instead of the beam-like arms 642 of motor 600. The protruding pedals 684a, 684b replace the crank pin pedals 644 of motor 600. Each pedal 684a, 684b is attached on only one side to a shaft face apart from the shaft axis 691. Four EAP rolled assemblies 670a, 670b, 670c, 670d, such as rolled EAP assembly 510, are included. Two rolled EAP assemblies attach to each pedal; e.g., rolled EAP assemblies 670a, 670b are attached to pedal 684a, and rolled EAP assemblies 670c, 670d are attached to pedal 684b. The opposite side of each rolled EAP assembly 670a, 670b, 670c, 670d is attached to a cylindrical interior surface 651 of the support framework. In other embodiments, more or fewer or different EAP rolled assemblies are attached to pedals 684a, 684b.

In the illustrated embodiment depicted in FIG. 6A, two leads (electrical connections) electrically connect the distributor 660 to each rolled EAP assembly. With other assemblies having a different number of rolled EAP devices, a different number of leads may be used. In the illustrated embodiment, the shaft 640, arms 642 and pedals 644 are electrically conductive and electrically connected to electrical ground, similar to motor 200. Each rolled EAP device in each assembly 510 has one input electrode connected to electrical ground. The other input electrode in each EAP rolled device in each assembly 510 is connected to at least one of the leads from distributor 660. For example, input electrodes in rolled EAP devices 502, 512 connected to electrodes 507, 515, respectively, are electrically grounded, while electrode 505 is connected by one lead to distributor 660 and electrode 517 is connected by the other lead to distributor 660. In some embodiments, the support framework and rolled EAP assembly are electrically grounded, one lead is passed to one rolled EAP device through the support framework, and a separate lead is passed to the other rolled EAP device through the shaft 640, arm 642 and pedal 644. With separate leads, each rolled EAP device may extend and retract separately.

In some embodiments, only one lead is routed from distributor 660 to each assembly 510. For example, input electrodes in rolled EAP devices 502, 512 connected to electrodes 507, 515, respectively, are electrically grounded, while electrodes 505, 517 are connected by their only lead to distributor 660. With only one lead from distributor 660 for each assembly, all rolled EAP devices in each rolled EAP assembly extend and retract together.

Figure 7:
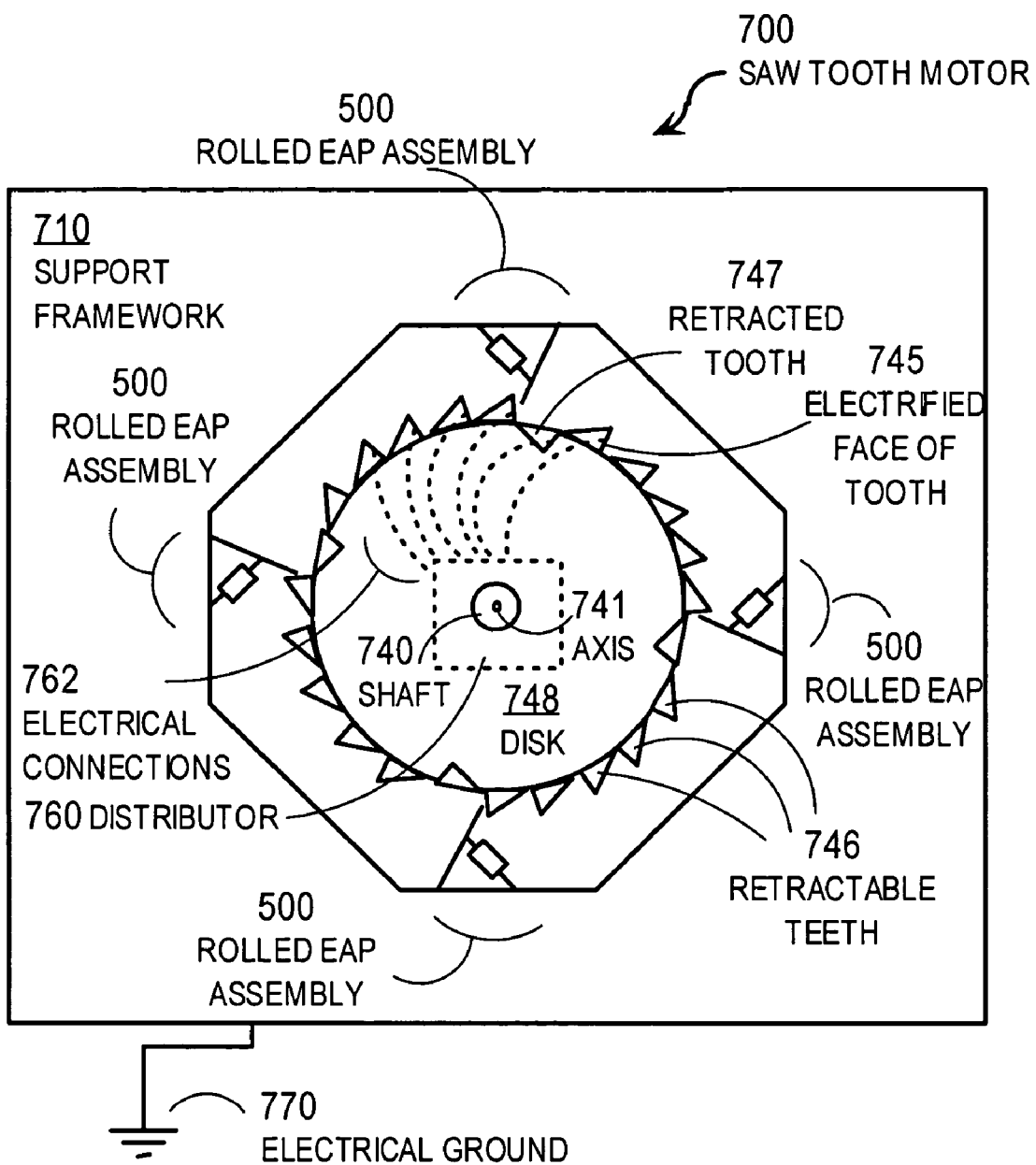
FIG. 7 is a block diagram that illustrates a saw tooth motor according to an embodiment.

FIG. 7 is a block diagram that illustrates a saw tooth motor 700 according to an embodiment. The motor 700 includes a support framework 710, a shaft 740 having an axis of rotation 741, a disk 748 having an axis concentric with the shaft axis 741, and multiple rolled EAP assemblies 500. Also shown in FIG. 7 are a voltage distributor 760 and electrical ground 770. The view in FIG. 7 is in the direction of the axis of rotation of shaft 740. The function and materials of these components are similar to the analogous components depicted and described above.

In the illustrated embodiment, there are four rolled EAP assemblies 500 arranged radially around the axis of rotation 741. In these assemblies, beam 504 has been fixed to support framework 710. In other embodiments, more or fewer or different rolled EAP assemblies are employed. For example, a rolled EAP assembly in which beam 504 is replaced by the support framework is used. In some embodiments, a rolled EAP assembly is replaced by a rolled EAP in a sleeve attached to framework 710. In some embodiments, a flywheel is included.

In the illustrated embodiment, the shaft 740 includes a disk 748 that extends outward from the axis 741 to provide leverage for the rolled EAP assemblies to apply torque on the shaft 740. The disk 748 provides a function similar to the arms of the motors 600, 650, described above. The disk need not be circular or thin; in some embodiments the disk has a length along shaft 840 that is substantial compared to its radius. At the periphery of the disk 748 are teeth 746 for engaging a free end of a rolled EAP assembly. In some other embodiments more or fewer teeth are included on the periphery of the disk. In some other embodiments, other coupling mechanisms are used to engage the free end of a rolled EAP assembly, such as grooves in a cylinder side.

When the rolled EAP assembly 500 is extended, a free end penetrates an outer radius defined by a line segment from the axis 741 to a part of a tooth most distant from the axis 741. When the rolled EAP 500 subsequently retracts, the free end pushes against a trailing face of a tooth, applying torque to the shaft so the shaft rotates. In FIG. 7, the shaft rotates counterclockwise when pushed by the retracting free end of the rolled EAP assembly 500.

In the illustrated embodiment, the free end extends to engage another tooth (or the same tooth on a subsequent revolution of the disk 748). In some embodiments, the free end may penetrate the outer radius and contact the leading face of a tooth. In the illustrated embodiment, a following tooth (e.g., retracted tooth 747) retracts below the outer radius either to avoid contacting the extending free end or in response to contacting the extended free end. After passing the extended free end, the tooth returns to its extended state. Any mechanism may be used to retract and extend the tooth; for example, the tooth can reside in a grove with a weak spring that easily yields to an extending free end, and returns the tooth to the extended state after clearing the free end, similar to a ratcheting mechanism. In some embodiments, the retractable teeth 746 are moved with separate EAP devices (not shown).

In some embodiments, the rolled EAP assembly has sufficient stroke to clear the outer radius as the leading face of each tooth passes and still engage the trailing face of the tooth. In some such embodiments, the teeth 746 do not retract.

In the illustrated embodiment, the trailing face of each tooth is an electrified face 745 of the tooth. For example, the electrified face 745 is an electrode with a voltage supplied by a distributor 760 included in disk 748. In this embodiment, the state of each rolled EAP assembly is extended when no voltage difference is supplied between the two input electrodes. The assembly contracts when a voltage difference is applied between the two input electrodes. In this embodiment, the support framework 710 is grounded and electrode 505 is electrically connected to the support framework. Electrode 507 is also at ground voltage until it contacts the electrified face 745 of a tooth 746. When the retracted tooth 747 returns to its extended state, the electrified face 745 contacts electrode 507 on the free end of rolled EAP assembly 500 The rolled EAP assembly 500 retracts, pushing against the electrified face 745 of tooth 746, thus applying torque to the disk 748 and rotating the shaft 740.

The voltage is supplied to the electrified face 745 by electrical connections 762 from the distributor 760. In other embodiments, the distributor is outside the disk or the shaft or both and the electrical connections extend through the shaft to the distributor on or outside the shaft. In still other embodiments, the teeth 746, disk 748, and shaft 740 are maintained at electrical ground and the distributor provides timed pulses along connections to rolled EAP assemblies 500 through electrical connections (not shown) through the support framework 710.

Figure 8:
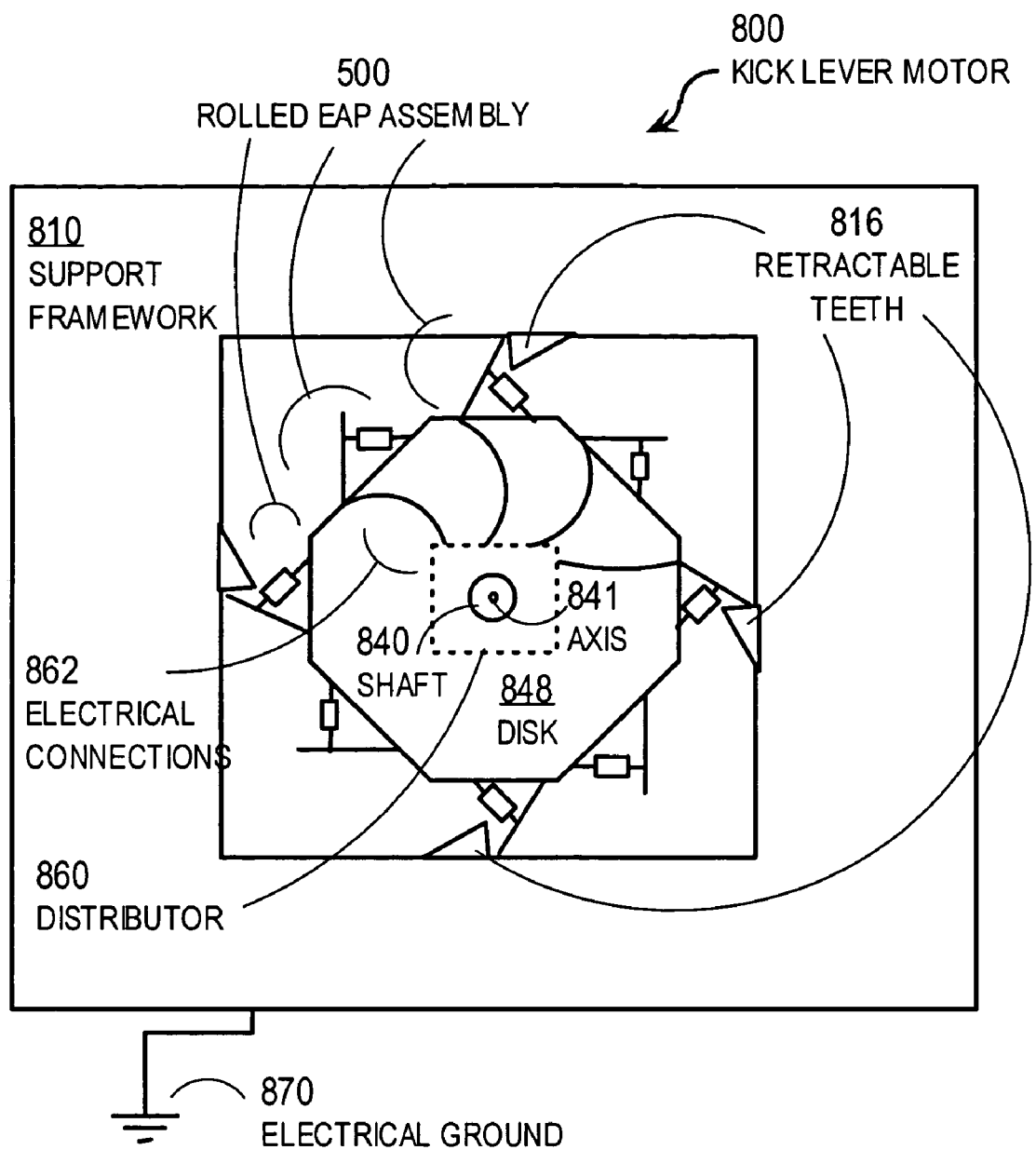
FIG. 8 is a block diagram that illustrates a kick lever motor according to an embodiment.

FIG. 8 is a block diagram that illustrates a kick lever motor 800 according to an embodiment. The motor 800 includes a support framework 810, a shaft 840 having an axis of rotation 841, a disk 848 having an axis concentric with the shaft axis 841, and multiple rolled EAP assemblies 500. Also shown in FIG. 8 are a voltage distributor 860 and electrical ground 870. The view in FIG. 8 is in the direction of the axis of rotation of shaft 840. The function and materials of these components are similar to the analogous components depicted and described above.

In the illustrated embodiment, the shaft 840 includes a disk 848 that extends outward from the axis 841 to provide leverage for the rolled EAP assemblies to apply torque on the shaft 840. The disk 848 provides a function similar to the arms of the motors 600, 650, described above. The disk need not be circular; in the illustrated embodiment the disk 848 is octagonal. The disk need not be thin, in some embodiments the disk has a length along shaft 840 that is substantial compared to its radii to different points on its periphery. At the periphery of the disk 748 are eight rolled EAP assemblies 500 arranged radially around the axis of rotation 841. In these assemblies 500, beam 504 has been fixed to disk 848. In other embodiments, more or fewer or different rolled EAP assemblies are employed. For example, a rolled EAP assembly in which beam 504 is replaced by the disk is used. In some embodiments, a rolled EAP assembly is replaced by a rolled EAP in a sleeve attached to disk 848. In some embodiments, a flywheel is included.

In the illustrated embodiment, the support framework 810 includes four teeth 816 for engaging a free end of a rolled EAP assembly. In some other embodiments more or fewer teeth are included on the support framework 810. In some other embodiments, other coupling mechanisms are used to engage the free end of a rolled EAP assembly, such as grooves in an interior wall of support framework 810.

When the rolled EAP assembly 500 is extended, a free end reaches toward the inner surface of support framework 810 in the vicinity of a tooth 816 within a distance less than a height of the tooth 816. When the rolled EAP 500 subsequently retracts, the free end pushes against a steep (trailing) face of a tooth, applying torque to the shaft so the shaft rotates. In FIG. 8, the shaft rotates counterclockwise when the retracting free end of the rolled EAP assembly 500 pushes against tooth 816.

In the illustrated embodiment, the free end extends to engage another tooth (or the same tooth on a subsequent revolution of the disk 848). In some embodiments, the extending free end may contact a shallow sloped (leading) face of a tooth 816. In the illustrated embodiment, a tooth retracts below the reach of the free end of the rolled EAP assembly 500, either to avoid contacting the extending free end or in response to contacting the extended free end. After being passed by the extended free end, the tooth returns to its extended state. Any mechanism may be used to retract and extend the tooth; for example, the tooth can reside in a grove with a weak spring that easily yields to an extending free end, and returns the tooth to the extended state after clearing the free end, similar to a ratcheting mechanism. In some embodiments, the retractable teeth 816 are moved with separate EAP devices (not shown).

In some embodiments, the rolled EAP assembly 500 has sufficient stroke to clear the leading face as it passes each tooth and still engage the trailing face of the tooth. In some such embodiments, the teeth are not retractable.

In the illustrated embodiment, the teeth 816 and support framework 810 are electrically grounded and electrode 507 is electrically connected to the support framework 810 when the free end contacts on of the teeth 816. Electrode 505 on each rolled EAP assembly 500 is electrically connected to distributor 860 on the disk 848 by an electrical connection 862. In other embodiments, the distributor 860 is outside the disk or the shaft or both and the electrical connections extend through the shaft to the distributor on or outside the shaft. The distributor 860 provides a high voltage to a rolled EAP assembly 500. The high voltage is timed to occur when the free end of that assembly is to be extended to engage a tooth 816 on the support framework 810. The distributor 860 drops the voltage at times when the trailing face of the tooth has been engaged. When the voltage drops, the rolled EAP assembly 500 retracts, pushing against the trailing face of tooth 816, and thus applying torque to the disk 848 and rotating the shaft 840.

In some other embodiments, the rolled EAP assembly extends at no voltage difference and retracts when a voltage difference is applied. In some of these embodiments the trailing face of each tooth is an electrified face of the tooth connected to a distributor; the disk is grounded, and the assembly 500 contracts when the extended end contacts the electrified face of the tooth.

Electrically Conductive Drives

As described above, in many embodiments of both sleeve and lever motors a drive shaft is electrically conducting; for example, to provide an electrical ground for one of the two input electrodes of each rolled EAP device. In some embodiments described above, one or more high voltage leads are provided through the drive shaft.

According to additional embodiments, the sheet EAP motors of Heim I and Heim II may be used with an electrically conductive drive member to provide the second electrical potential for driving the sheet EAP device. An advantage of such embodiments is that only one electrical connection need be made to the fixed end of the sheet EAP device.

Variable Speed Rotating Output

Figure 9:
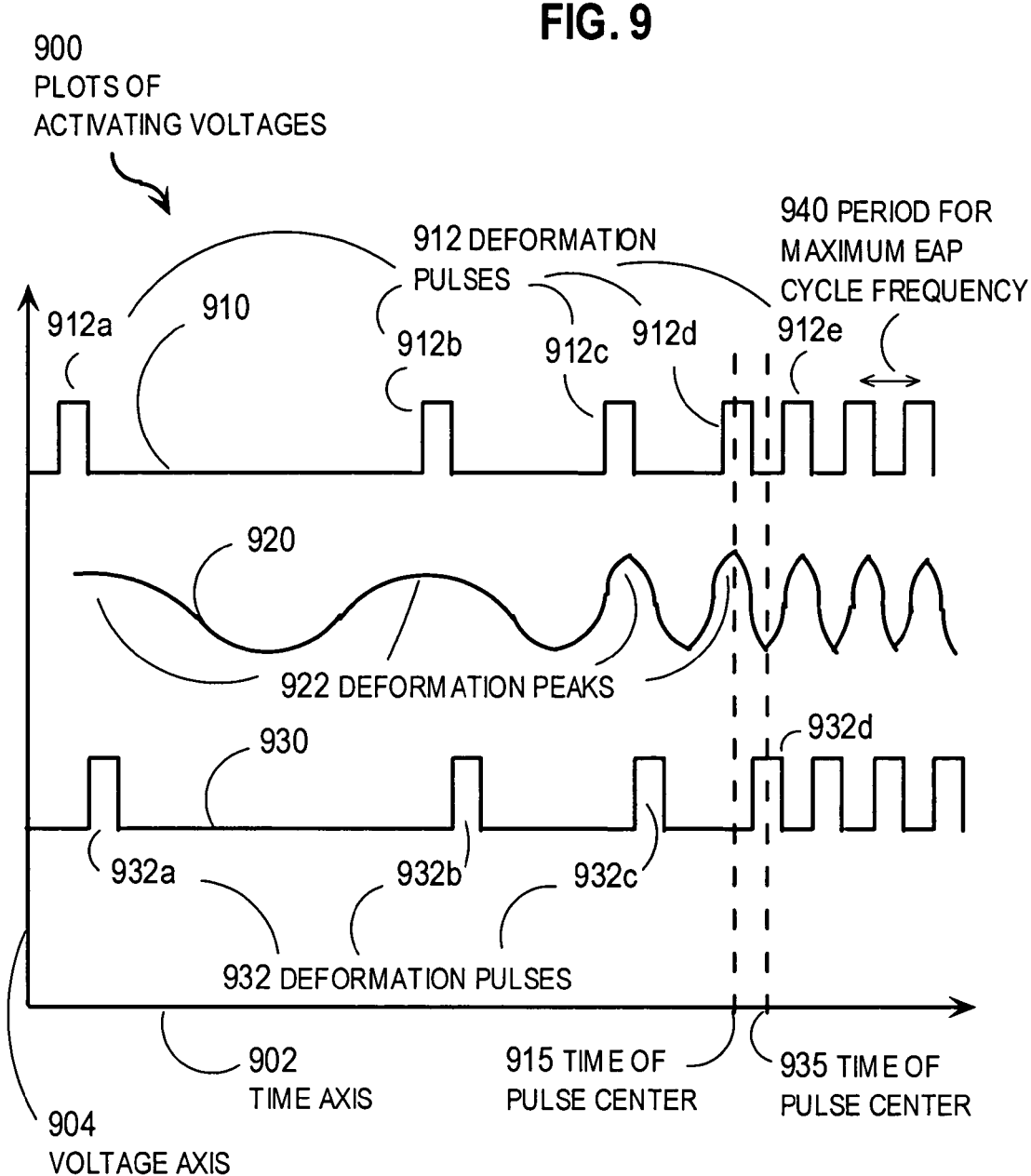
FIG. 9 is a graph that plots activating voltages applied to EAP devices, according to various embodiments.

As stated above, the distributor may be utilized to generate variable rate rotational output up to the product $N*M_R$. FIG. 9 is a graph 900 that plots activating voltages applied to rolled EAP devices, according to various embodiments. The time axis 902 indicates elapsed time, increasing to the right in arbitrary units. The voltage axis 904 indicates voltage differences in arbitrary units. Each of three traces 910, 920, 930 are plotted to indicate the voltage output by a distributor along one electrical connection to an input electrode of a rolled EAP device. The three traces are offset from each other by adding a different arbitrary voltage to each. The added voltages decrease from trace 910 to trace 920 to trace 930.

For each of traces 910, 920, 930 the voltage varies from a minimum voltage associated with a rest state of a rolled EAP device to a maximum voltage associated with a maximum deformation state of the rolled EAP device. Either the rest state or the maximum deformation state may be the extended state or the retracted state of the rolled EAP device. For example, a spring roll is retracted in a rest state and is extended 2 cm in the maximum deformation state.

Trace 910 reflects the activating voltage applied by a distributor to one rolled EAP device. The trace includes multiple pulses 912, including pulses 912a, 912b, 912c, 912d, 912e, among others. In response to each pulse 912, the rolled EAP device deforms. The rolled EAP device deforms to its maximum deformation state if the pulse duration is at least as long as the response time of the device. For a spring roll with a 50 Hz maximum cycle frequency ($M_R$), the response time is no more than about 0.01 seconds. The pulses can be no closer than the period associated with $M_R$, e.g., 0.02 seconds for a spring roll with a 50 Hz $M_R$. The period for the $M_R$ is indicated in FIG. 9 by the time interval 940.

In the illustrated embodiment, a rolled EAP device receiving the activating voltage of trace 910 deforms maximally with each pulse 912.

A rolled EAP device in a rolled EAP assembly in a lever motor like motor 700 or 800 contracts 2 cm in response to pulse 912a. A tooth is pushed and the shaft begins to rotate. At the end of the pulse, the rolled EAP device expands. Based on the force applied and the mass of the shaft and any flywheel, the shaft rotates at a particular rate. The rotation rate can be increased by applying subsequent pulses to the same or a different rolled EAP device. The motion is jerky with each pulse, and a flywheel may be needed to smooth out the rotation rate. Based on the frequency of the pulses, a variable rotation rate can be achieved.

A similar situation develops for a rolled EAP device in a sleeve of motor 200. The rolled EAP device extends by its stroke amount in response to pulse 912a; for example a spring roll EAP device extends by its stroke of 2 cm. The crankshaft begins to rotate. At the end of the pulse, the rolled EAP device retracts. If the rolled EAP is not fixed in the sleeve, as depicted in FIG. 4C and FIG. 4D, for example, then the retraction does not act on the crankshaft, and the retracted rolled EAP device simply slides in the sleeve with the revolution of the crank pin around the crankshaft axis. The crank arm on the crankshaft can be greater than the stroke of the rolled EAP device; the momentum of the crankshaft and any flywheel may cause the crankshaft to complete its revolution and return the rolled EAP device to contact the base of the sleeve. Based on the force applied and the mass of the shaft and any flywheel, the shaft rotates at a particular rate. The rotation rate can be increased by applying subsequent pulses to the same or a different rolled EAP device. The motion is jerky with each pulse, and a flywheel may be needed to smooth out the rotation rate. Based on the frequency of the pulses, a variable rotation rate can be achieved.

If the rolled EAP is fixed in the base of the sleeve, the retraction also pulls on the crankshaft and forces the crankshaft to complete a rotation by the response time after the end of the pulse. The pulses of trace 910 would cause the crankshaft to rotate once and stop. To keep the shaft rotating, the pulses would have to be spaced a response time apart as shown by pulses 912d, 912e and subsequent pulses. To achieve other speeds, a gearbox or other transmission device would be employed. A similar situation occurs in lever motors in which both ends of a rolled EAP assembly are permanently attached, as in pedal motors 600, 650.

Smooth variable speeds may be obtained from rolled EAP devices by applying gradually changing voltages instead of pulses. Trace 920 reflects the activating voltage applied by a distributor to one rolled EAP device. Instead of applying a pulse, the voltage is increased gradually to the maximum voltage to achieve maximum deformation and then decreased gradually to the minimum voltage. For an extended maximum deformation, this amounts to a slow push followed by a slow pull (for a retracted maximum deformation, this represents a pull followed by a push). In the illustrated embodiment, the timing of peaks 922 in trace 920 correspond to the timing of pulses 912 in trace 910. The peaks can be formed at any rate, and varied continuously up to the maximum cycle frequency for the rolled EAP device.

In sleeve motors with one end of the rolled EAP device fixed in the base of the sleeve, or in pedal motors in which both ends of the rolled EAP assembly are permanently attached, a smooth trace like trace 920 can smoothly turn the shaft in the motor at any speed up to the maximum cycle frequency of the rolled EAP device. In some embodiments, the rotation is so smoothly controlled by the activating voltage traces that a flywheel can be eliminated from the motor.

To produce rotation rates that exceed the maximum cycle frequency ($M_R$) a motor with multiple rolled EAP devices is used in which one end of each rolled EAP device is not permanently connected to either shaft or support framework, such as sleeve motors with rolled EAP devices not fixed in the bases of the sleeves and lever motors such as motors 700 and 800. In such motors, different rolled EAP devices can be pulsed with pulses that are closer together than the period 940 associated with $M_R$.

For example, in a sleeve motor with two sleeves, a first rolled EAP device in one sleeve can be activated with trace 910 and a second rolled EAP device in a second sleeve can be activated with trace 930. With each pulse, the crankshaft rotates at least once. In trace 930, the deformation pulses 932 are timed to fall after the pulses 912 in trace 910 by half the period 940. For example, the time of pulse 912*d* is represented by the time 915 of its midpoint and the time of pulse 932*d* is given by the time 935 of its midpoint. The time delay between 915 and 935 is half the period 940 associated with $M_R$. Therefore, when the pulses are fed to each rolled EAP device at $M_R$, the shaft rotates twice during each cycle, and the shaft rotation rate is twice $M_R$. For example, in embodiments using the spring roll EAP devices with $M_R$ of 50 Hz, the motor's shaft can rotate at 100 Hz (6000 rpm).

In general, with N rolled EAP devices each having one free end, the pulses may be timed to be P/N apart where P is the period 940 for $M_R$, i.e., the pulses are timed to be apart by $1/(M_R*N)$. If the response time is sufficiently fast for each EAP device, a shaft rotation rate $S_R$ of $M_R*N$ can be achieved, as given above by Equation 1.

The actual voltage traces and timing may be easy to determine for one or more rolled EAP devices in a motor. EAP devices respond to deformation with voltage changes which can be measured. Therefore, the shaft of a motor may be turned mechanically by an external force at one or more rotation rates and the voltage traces output at each rolled EAP device can be recorded. Those recorded traces may then be applied to drive the motor at the desired rotation rate.

Vehicle

Figure 10:
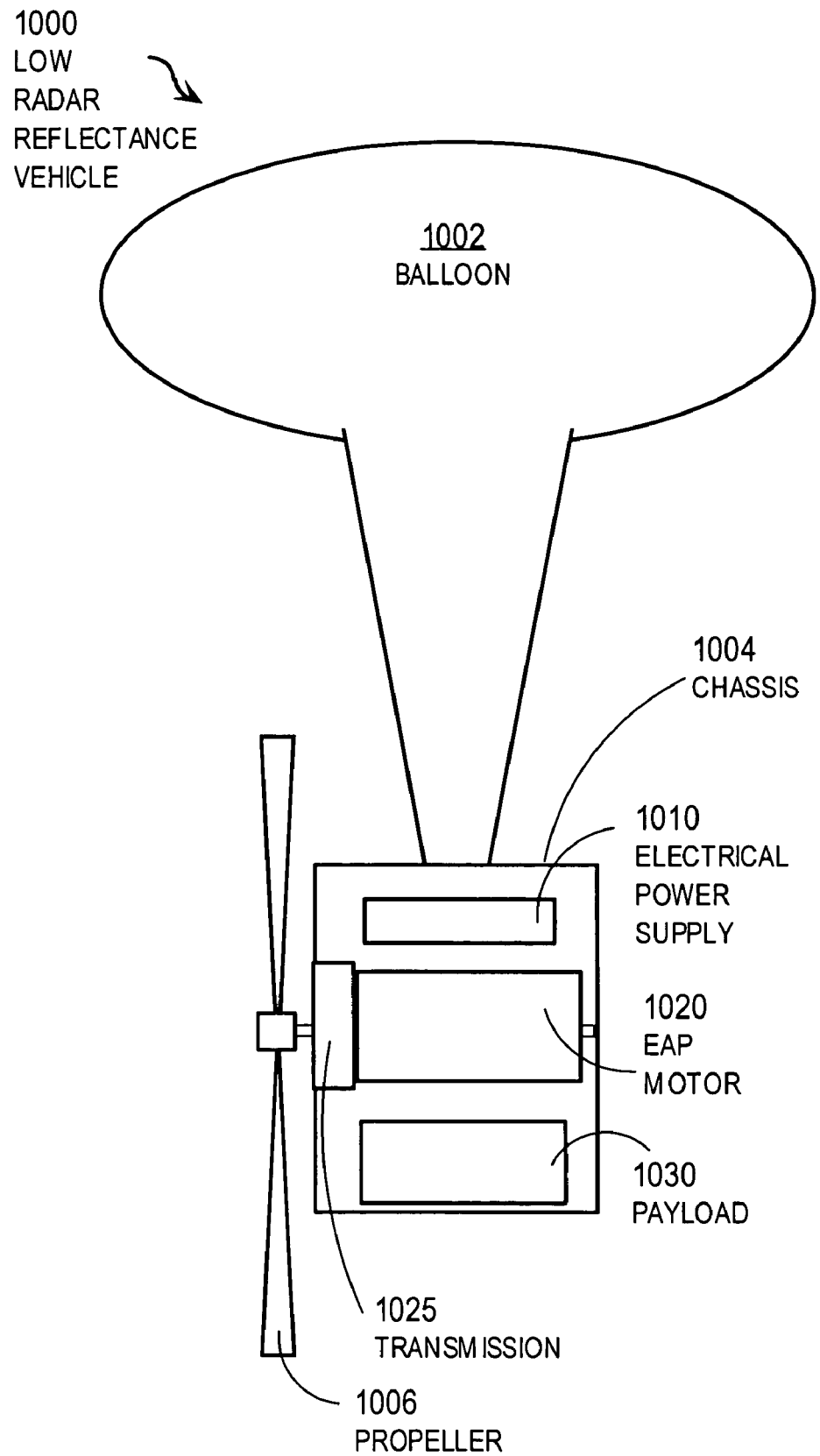
FIG. 10 is a block diagram that illustrates a powered vehicle with low radar reflectance, according to an embodiment.

FIG. 10 is a block diagram that illustrates a powered vehicle 1000 with low radar reflectance, according to an embodiment. The vehicle 1000 includes a balloon 1002 (e.g., an aerodynamically shaped gas bag), a chassis 1004 and a propeller 1006.

The balloon 1002 provides buoyancy in a gaseous medium to carry the weight of the other components at a given altitude in the atmosphere of a planet such as Earth or Mars. In other embodiments, other components that provide complete or partial buoyancy can be used. The balloon 1002 is made of a material with low radar reflectivity.

The propeller 1006 provides horizontal position control for the vehicle by rotating to move fluid with respect to the vehicle. The propeller 1006 is made of a material with low radar reflectivity.

The chassis 1004 includes an electrical power supply 1010, a rolled EAP device motor 1020, a transmission 1035, and a payload 1030. The chassis 1004 is made of a light strong material with low radar reflectivity, such as honeycombed plastic, ceramics, carbon or composite materials, among others.

The power supply 1010 may be any electrical power supply known, including chemical batteries, power cells and solar panels, among others. In some embodiments, the power supply includes a transformer to produce high voltages used by rolled EAP devices. In some embodiments, the power supply 1010 includes a distributor, such as distributor 260, to provide high voltage traces to input electrodes on motor 1020. The chassis 1004 is made primarily of a light strong material with low radar reflectivity, with electrical conductors of small width that have low radar reflectivity, or coated with radar absorbing material (RAM) to reduce radar reflections.

The payload 1030 may be any item or collection of items productively mounted to the chassis 1004, such as surveillance equipment and communications equipment. In a preferred embodiment each payload item is constructed so as to reduce or minimize its radar reflectivity.

The motor 1020 is a motor using multiple rolled EAP devices to provide sufficient horsepower to rotate the propeller for horizontal position control. In a preferred embodiment the motor 1020 provides over one horsepower to rotate propeller 1006. The motor and its component are made of light strong materials with low radar reflectivity, such as honeycombed plastic, ceramics, carbon or composite materials, among others. Electrical conductors are made thin or of non-reflective materials or RAM coated so as to reduce their radar reflectivity. In some embodiments, the motor 1020 includes a distributor, such as distributor 260, to provide high voltage traces to input electrodes on the rolled EAP devices based on voltages from the power supply 1010. In some embodiments, the motor 1020 also includes a transformer to produce high voltages used by rolled EAP devices from lower voltages provided by power supply 1010.

In the illustrated embodiment, the chassis also includes transmission 1025 connected between motor 1020 and propeller 1006. The transmission 1025 converts rotor speed from motor 1020 to an appropriate speed of propeller 1006 for horizontal position control. The transmission 1025 is made of a light strong material with low radar reflectivity, such as honeycombed plastic, ceramics, carbon or composite materials, among others. In some embodiments, motor 1020 provides sufficient shaft rotation rate control that transmission 1025 is omitted.

Further details of an example arrangement of vehicle 1000 are provided in U.S. non-provisional application Ser. No. 10/892,911 , filed on even date herewith, entitled "HIGH ALTITUDE RECONNAISSANCE VEHICLE," by inventors Krill et al., which is incorporated herein by reference in its entirety.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A motor comprising:
   a support framework;
   a rolled electroactive polymer device having a pair of input electrodes and configured to deform substantively only parallel to a roll longitudinal axis upon application of an electric potential difference across the pair of input electrodes; and
   a shaft rotatably mounted to the support framework, wherein
      the rolled electroactive polymer device is mechanically linked to the support framework and to the shaft, and
      deformation of the rolled electroactive polymer device causes the shaft to complete a revolution relative to the support framework.

2. A motor comprising:
   a support framework including a sleeve with a sleeve longitudinal axis and sleeve base;
   a rolled electroactive polymer device having a pair of input electrodes and configured to deform substantively only parallel to a roll longitudinal axis upon application of an electric potential difference across the pair of input electrodes, said electroactive polymer device disposed in the sleeve with the roll longitudinal axis aligned with the sleeve longitudinal axis; and
   a crankshaft rotatably mounted to the support framework, wherein a first portion of the rolled electroactive polymer device pushes against the sleeve base and a second, different portion of the rolled electroactive polymer device is mechanically connected to a crank pin of the crankshaft, whereby deformation of the rolled electroactive polymer device causes the crankshaft to rotate with respect to the support framework.

3. The motor as recited in claim 2, wherein:
the motor further comprises a voltage input for receiving a time varying electrical potential;
the crankshaft is electrically connected to at least one of the voltage input and an electrical ground; and
a first electrode of the pair of input electrodes of the rolled electroactive polymer device is electrically connected to the crankshaft.

4. The motor as recited in claim 3, wherein:
the motor further comprises a sleeve electrode fixed in the sleeve and electrically connected to at least one of the voltage input and the electrical ground; and
a different second electrode of the pair of input electrodes is electrically connected to the sleeve electrode.

5. The motor as recited in claim 3, wherein:
the crankshaft further comprises a crankshaft electrode electrically insulated from the crankshaft and electrically connected to at least one of the voltage input and the electrical ground; and
a different second electrode of the pair of input electrodes is electrically connected to the crankshaft electrode.

6. The motor as recited in claim 2, wherein:
the motor further comprises a voltage input for receiving a time varying electrical potential;
the motor further comprises a first sleeve electrode fixed in the sleeve and electrically connected to at least one of the voltage input and the electrical ground; and
a first electrode of the pair of input electrodes is electrically connected to the first sleeve electrode.

7. The motor as recited in claim 6, wherein:
the motor further comprises a second sleeve electrode fixed in the sleeve and electrically connected to at least one of the voltage input and the electrical ground; and
a second electrode of the pair of input electrodes is electrically connected to the second sleeve electrode.

8. The motor as recited in claim 2, wherein the rolled electroactive polymer device and the sleeve are made to have a low radar reflectivity compared to a same radar-illuminated surface area of metal.

9. The motor as recited in claim 2, wherein the sleeve comprises a structure with a specific gravity substantively similar to honeycombed plastic.

10. The motor as recited in claim 2, wherein the rolled electroactive polymer device and the support framework are made to have low radar reflectivity compared to a same radar-illuminated surface area of metal.

11. The motor as recited in claim 10, wherein the support framework comprises a structure with a specific gravity substantively similar to honeycombed plastic.

12. The motor as recited in claim 2, wherein the rolled electroactive polymer device and the crankshaft are made to have low radar reflectivity compared to a sameradar-illuminated surface areas of metal.

13. The motor as recited in claim 10, wherein the crankshaft comprises a structure with a specific gravity substantively similar to honeycombed plastic.

14. The motor as recited in claim 2, wherein: the support framework includes a plurality of sleeves;
the crankshaft comprises a plurality of crank pins;
the motor comprises a plurality of rolled electroactive polymer devices disposed in the plurality of sleeves, each rolled electroactive polymer device including a first portion that pushes against a sleeve base in a corresponding sleeve of the plurality of sleeves and a second different portion mechanically connected to a corresponding crank pin of the plurality of crank pins.

15. The motor as recited in claim 14, wherein the motor is capable of rotating the crankshaft with mechanical power in excess of one horsepower.

16. The motor as recited in claim 14, further comprises a voltage distributor for sequencing a time varying electrical potential at a first electrode of each rolled electroactive polymer device of the plurality of rolled electroactive polymer devices to achieve a variable rate of rotation for the crankshaft.

17. The motor as recited in claim 16, wherein a flywheel is not contained in the motor.

18. The motor as recited in claim 2, wherein the first portion is fixed in the base of the sleeve.

19. The motor as recited in claim 2, wherein the first portion is not fixed in the base of the sleeve.

20. The motor as recited in claim 16, wherein,
each rolled electroactive polymer device has a maximum frequency limit for cycling from maximum deformation to minimum deformation and back to maximum deformation; and
the distributor sequences the time varying electrical potential at each electroactive polymer device so that the crankshaft rotates at a rotation frequency greater than the maximum frequency limit of each rolled electroactive polymer device.

21. A motor comprising:
a support framework;
a shaft having a longitudinal shaft rotation axis, said shaft rotatably mounted to the support framework and including an arm that encloses a position substantively offset from the shaft axis; and
an electroactive polymer assembly comprising
a pair of structures joined at a pivot joint, and
a rolled electroactive polymer device having a pair of input electrodes and configured to deform substantively only parallel to a roll longitudinal axis upon application of an electric potential difference across the pair of input electrodes, each of two longitudinally opposite ends of said electroactive polymer device connected to a corresponding structure of the pair of structures;
wherein deformation of the rolled electroactive polymer device causes a first structure of the pair of structures to exert a force against the support framework and a different second structure of the pair of structures to exert a force against the arm of the shaft at a position substantively offset from the shaft axis, whereby the shaft rotates about the shaft axis with respect to the support framework.

22. The motor as recited in claim 21, wherein the arm is a disc having a disk axis that is concentric with the shaft axis.

23. The motor as recited in claim 21, wherein the first structure is attached to the support framework and the second structure contacts a coupler on the arm of the shaft.

24. The motor as recited in claim 23, wherein the coupler is moveable to disengage from the second structure.

25. The motor as recited in claim 21, wherein the first structure is permanently attached to the arm at a position substantively offset from the shaft axis and the second structure contacts a coupler on the support framework.

26. The motor as recited in claim 23, wherein the second structure is a beam.

27. The motor as recited in claim 21, wherein:
the motor further comprises a voltage input for receiving a time varying electrical potential;
the shaft includes a first shaft electrode that is electrically connected to at least one of the voltage input and an electrical ground; and
a first electrode of the pair of input electrodes of the rolled electroactive polymer device is electrically connected to the first shaft electrode during deformation.

28. The motor as recited in claim 27, wherein:
the motor further comprises a framework electrode fixed in the support framework and electrically connected to at least one of the voltage input and the electrical ground; and
a different second electrode of the pair of input electrodes is electrically connected to the framework electrode during deformation.

29. The motor as recited in claim 27, wherein:
the shaft further comprises a second shaft electrode electrically insulated from the first shaft electrode and electrically connected to at least one of the voltage input and the electrical ground; and
a different second electrode of the pair of input electrodes is electrically connected to the shaft electrode during deformation.

30. The motor as recited in claim 21, wherein:
the motor further comprises a voltage input for receiving a time varying electrical potential;
the motor further comprises a first framework electrode fixed in the, framework and electrically connected to at least one of the voltage input and the electrical ground; and
a first electrode of the pair of input electrodes is electrically connected to the first framework electrode during deformation.

31. The motor as recited in claim 30, wherein:
the motor further comprises a second framework electrode fixed in the support framework and electrically connected to at least one of the voltage input and the electrical ground; and
a second electrode of the pair of input electrodes is electrically connected to the second framework electrode.

32. The motor as recited in claim 21, wherein the electroactive polymer assembly is made to have low radar reflectivity.

33. The motor as recited in claim 21, wherein each structure of the pair of structures in the electroactive polymer assembly comprises a structure with a specific gravity substantively similar to honeycombed plastic.

34. The motor as recited in claim 21, wherein the support framework is made to have low radar reflectivity.

35. The motor as recited in claim 34, wherein the support framework comprises a structure with a specific gravity substantively similar to honeycombed plastic.

36. The motor as recited in claim 21, wherein the shaft is made to have low radar reflectivity.

37. The motor as recited in claim 34, wherein the shaft comprises a structure with a specific gravity substantively similar to honeycombed plastic.

38. The motor as recited in claim 21, the motor further comprising a plurality of electroactive polymer assemblies, wherein deformation of a rolled electroactive polymer device in each electroactive polymer assembly causes a first structure of a corresponding pair of structures to push against the support framework and a different second structure of the corresponding pair of structures to push against the arm of the shaft at a position substantively offset from the shaft axis.

39. The motor as recited in claim 38, wherein the motor is capable of rotating the shaft with mechanical power in excess of one horsepower.

40. The motor as recited in claim 38, further comprises a voltage distributor for sequencing a time varying electrical potential at a first electrode of each rolled electroactive polymer device of the plurality of electroactive polymer assemblies to achieve a variable rate of rotation for the shaft.

41. The motor as recited in claim 40, wherein a flywheel is not contained in the motor.

42. The motor as recited in claim 21, the motor further comprising:
a plurality of arms connecting the shaft to a plurality of positions substantively offset from the shaft axis; and
a plurality of electroactive polymer assemblies, wherein deformation of a rolled electroactive polymer device in each electroactive polymer assembly causes a first structure of a corresponding pair of structures to push against the support structure and a different second structure of the pair of structures to push against an arm of the plurality of arms at a position substantively offset from the shaft axis.

43. The motor as recited in claim 21, wherein said pivot joint is a hinge that confines relative motion of the pair of structures to a particular plane.

44. The motor as recited in claim 21, wherein at least one structure of the pair of structures further comprises a different electroactive polymer assembly.

45. The motor as recited in claim 21, wherein the first structure of the pair of structures is the support framework.

46. The motor as recited in claim 21, wherein the second structure of the pair of structures is the arm of the shaft.

* * * * *